United States Patent
Lingampalli

(10) Patent No.: US 10,206,017 B2
(45) Date of Patent: *Feb. 12, 2019

(54) AUTOMATED FIBER CROSS-CONNECT SERVICE WITHIN A MULTI-TENANT INTERCONNECTION FACILITY

(71) Applicant: Equinix, Inc., Redwood City, CA (US)

(72) Inventor: Mohan Rao G. Lingampalli, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/675,317

(22) Filed: Aug. 11, 2017

(65) Prior Publication Data

US 2017/0366882 A1 Dec. 21, 2017

Related U.S. Application Data

(63) Continuation of application No. 14/937,787, filed on Nov. 10, 2015, now Pat. No. 9,736,556.

(Continued)

(51) Int. Cl.
*H04Q 11/00* (2006.01)
*H04J 14/02* (2006.01)

(52) U.S. Cl.
CPC ...... *H04Q 11/0005* (2013.01); *H04J 14/0278* (2013.01); *H04Q 11/0062* (2013.01); *H04Q 11/0066* (2013.01); *H04Q 11/0067* (2013.01); *H04Q 2011/005* (2013.01); *H04Q 2011/0022* (2013.01); *H04Q 2011/0039* (2013.01); *H04Q 2011/0041* (2013.01); *H04Q 2011/0052* (2013.01); *H04Q 2011/0054* (2013.01);

(Continued)

(58) Field of Classification Search
None
See application file for complete search history.

(56) References Cited

U.S. PATENT DOCUMENTS 5,463,486 A  10/1995  Stevens
5,475,679 A  12/1995  Munter
(Continued)

FOREIGN PATENT DOCUMENTS

CN  103686467 A  3/2014
WO  2014143822 A1  9/2014

OTHER PUBLICATIONS

International Preliminary Report on Patentability from International Application No. PCT/US2016/050355, dated Mar. 22, 2018, 7 pp.

(Continued)

*Primary Examiner* — Li Liu
(74) *Attorney, Agent, or Firm* — Shumaker & Sieffert, P.A.

(57) ABSTRACT

In general, techniques are described for automatically configuring fiber cross-connects between customers of an interconnection facility. In some examples, a programmable network platform for an interconnection facility exposes an interface by which customers of the interconnection system provider may request fiber cross-connects to other customers of the interconnection system provider. The programmable network platform may, in response to a request for a fiber cross-connect, configure an optical switch fabric of the interconnection facility network infrastructure to create a fiber cross-connect between the demarcation points for the customers to be interconnected.

22 Claims, 9 Drawing Sheets

Related U.S. Application Data

(60) Provisional application No. 62/216,804, filed on Sep. 10, 2015.

(52) U.S. Cl.
CPC ........... *H04Q 2011/0058* (2013.01); *H04Q 2011/0064* (2013.01); *H04Q 2011/0073* (2013.01)

(56) References Cited

U.S. PATENT DOCUMENTS

| | | | |
|---|---|---|---|
| 6,211,979 | B1 | 4/2001 | Kang et al. |
| 6,362,908 | B1 | 3/2002 | Kimbrough et al. |
| 7,743,127 | B2 | 6/2010 | Santos et al. |
| 8,379,656 | B2 | 2/2013 | Waldrop et al. |
| 8,503,879 | B2 | 8/2013 | Xu et al. |
| 8,509,249 | B2 | 8/2013 | Waldrop et al. |
| 8,537,845 | B2 | 9/2013 | Waldrop et al. |
| 8,583,503 | B2 | 11/2013 | Waldrop et al. |
| 8,655,187 | B2 | 2/2014 | Davidson et al. |
| 8,751,323 | B2 | 6/2014 | Waldrop et al. |
| 8,756,344 | B2 | 6/2014 | Waldrop et al. |
| 9,082,091 | B2 | 7/2015 | Doraiswamy et al. |
| 9,269,061 | B2 | 2/2016 | Jeyapaul et al. |
| 9,467,378 | B1 | 10/2016 | Stark et al. |
| 9,736,556 | B2 * | 8/2017 | Lingampalli ...... H04Q 11/0066 |
| 2005/0074237 | A1 | 4/2005 | Spivey et al. |
| 2006/0251356 | A1 | 11/2006 | Zami et al. |
| 2011/0097083 | A1 | 4/2011 | Barrett |
| 2011/0145292 | A1 | 6/2011 | Lillie et al. |
| 2013/0188486 | A1 | 7/2013 | Thacker et al. |
| 2014/0133320 | A1 | 5/2014 | Stark et al. |
| 2014/0212135 | A1 | 7/2014 | Ji et al. |
| 2014/0270762 | A1 | 9/2014 | Li et al. |
| 2015/0043905 | A1 | 2/2015 | Graves et al. |
| 2015/0317197 | A1 | 11/2015 | Blair |
| 2016/0091685 | A1 | 3/2016 | Raza et al. |
| 2016/0127454 | A1 | 5/2016 | Maheshwari et al. |

OTHER PUBLICATIONS

Kachris et al: "Optical Interconnection Networks in Data Centers: Recent Trends and Future Challenges", IEEE Communications Magazine, vol. 51, Issue 9, Sep. 5, 2013, pp. 39-45.
U.S. Appl. No. 15/099,407, by Juxiang Teng, filed Apr. 14, 2016.
U.S. Appl. No. 14/927,451, by Gagan Maheshwari, filed Oct. 29, 2015.
U.S. Appl. No. 14/927,306, by Parveen Kumar, filed Oct. 29, 2015.
U.S. Appl. No. 14/927,315, by Venkatachalam Rangasamy, filed Oct. 29, 2015.
U.S. Appl. No. 15/001,766, by Ravindra JN Rao, filed Jan. 20, 2016.
U.S. Appl. No. 15/001,822, by Ravindra JN Rao, filed Jan. 20, 2016.
U.S. Appl. No. 15/001,839, by Ravindra JN Rao, filed Jan. 20, 2016.
U.S. Appl. No. 15/001,862, by Ravindra JN Rao, filed Jan. 20, 2016.
U.S. Appl. No. 15/001,875, by Ravindra JN Rao, filed Jan. 20, 2016.
U.S. Appl. No. 15/001,919, by Ravindra JN Rao, filed Jan. 20, 2016.
U.S. Appl. No. 14/868,177, by Robert J. Huey, filed Sep. 28, 2015.
Xi, et al., "Petabit Optical Switch for Data Center Networks," Polytechnic Institute of New York University, Oct. 5, 2012, 9 pp.
Calient Technologies, 3D MEMS Switching, "Photonic Switching Applications in Data Centers & Cloud Computing Networks," retrieved from http:/www.calient.net, Dec. 18, 2011, 11 pp.
International Search Report and Written Opinion of International Application No. PCT/US2016/050355, dated Nov. 25, 2016, 10 pp.
Prosecution History from U.S. Appl. No. 14/937,787, dated Nov. 18, 2016 through Apr. 12, 2017, 44 pp.
Examination Report from counterpart Canadian Application No. 2,998,117, dated Apr. 6, 2018, 4 pp.
Response to Canadian Office Action dated Apr. 6, 2018, from counterpart Canadian application No. 2,998,117, filed Jun. 8, 2018, 6 pp.

* cited by examiner

AUTOMATED FIBER CROSS-CONNECT SERVICE WITHIN A MULTI-TENANT INTERCONNECTION FACILITY

This application is a continuation of U.S. application Ser. No. 14/937,787 filed Nov. 10, 2015, which claims the benefit of U.S. Provisional Appl. No. 62/216,804, filed Sep. 10, 2015, the entire contents of which being incorporated herein by reference.

TECHNICAL FIELD

The invention relates to computer networks and, more specifically, to interconnecting computer networks.

BACKGROUND

A network services exchange provider or co-location provider (a "provider") may employ a communication facility, such as a data center or warehouse, in which multiple customers of the provider locate network, server, and storage gear and interconnect to a variety of telecommunications and other network service provider(s) with a minimum of cost and complexity. Data centers may be shared by the multiple tenants locating networking equipment within the data centers. With IT and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses.

In some cases, the communication facility provides interconnection services by which customers of the provider may interconnect to one another over the communication facility infrastructure or by which a customer of the provider may interconnect its spatially and/or geographically distributed customer networking equipment over the communication facility infrastructure. The communication facility may in such cases be referred to as an "interconnection facility" or "co-location facility."

One example of interconnection between different networks within an interconnection facility is a physical cross-connect, in which the provider manually installs a physical cable (such as a CAT5/6, coax, or optical fiber cable) that then provides a physical (e.g., "layer 0") connection between the customer networks for inter-customer interconnections (between different customers) or intra-customer interconnections (between areas of an interconnection center(s) that are operated/leased by a single customer). As noted above, optical fiber cabling infrastructure is typically manually installed by the provider between customer cages, with end-to-end or "home run"/"direct attach" optical fiber cabling between endpoints of an optical fiber cross-connect. In some cases, the provider uses structured cabling in the form of intermediate manual fiber patch panels in distribution facilities controlled by the provider that allow the cross-connect to take advantage of shared/trunked fiber cabling between distribution facilities. In many cases, optical fibers between distribution facilities are also manually installed per-cross-connect.

Due in part to significant growth in Internet traffic and services, fiber infrastructure in many communication facilities has become heavily overloaded to the point of exceeding the maximum infrastructure capacity available for physically carrying optical fibers, such as overhead fiber trays. An overloaded communication facility hinders additional fiber cross-connect needed to keep pace with the increasing client equipment fiber port densities required to support ever-increasing bandwidths and new generations of fiber rich networking equipment with high densities of client interfaces.

In addition, installing a new fiber cross-connect across the floor of an interconnection facility, between floors, across campuses, and across distributed interconnection facilities within a metropolitan area (or "metro") often requires several man days of work to determine infrastructure availability and to determine an available physical path through the various distribution facilities within the interconnection facilities. As noted above, a fiber cross-connect typically requires running home run fiber between the fiber cross-connect end points located at the respective demarcation points of customer cages. Depending on the service, multiple patch panel connections are required in addition to one or more optical fiber runs creating several segments from a customer cage in a data center to another customer cage in a different data center geographically located elsewhere in a metropolitan area, for instance.

Every fiber connection is typically manually designed for specific cable routing and often with field termination of fiber end points. However, when customers disconnect a cross-connect after some time of operation, this may trigger operational issues. For example, when customers request disconnection of a fiber cross-connect service, provider technicians mine out optical fiber cables between the cross-connect end points by physically removing them from the overhead fiber trays. When mining out optical fiber cables for a disconnects, other cables carrying live traffic for other customers may be inadvertently broken, thus potentially violating service level agreements (SLAs) with the other customers and potentially resulting in SLA penalties to the provider.

SUMMARY

In general, techniques are described for automatically configuring fiber cross-connects between customers of an interconnection facility. In some examples, a programmable network platform for an interconnection facility exposes an interface by which customers of the interconnection system provider may request fiber cross-connects to other customers of the interconnection system provider. The programmable network platform may, in response to a request for a fiber cross-connect, configure an optical switch fabric of the interconnection facility network infrastructure to create a fiber cross-connect between the demarcation points for the customers to be interconnected. The fiber cross-connect may facilitate non-blocking switching by way of a high-speed fiber connection between respective customers cages for the customers and, in doing so, may provide reliable and low-latency communication between the respective demarcation points of the customer cages. The fiber cross-connect may in this way underlie higher-layer network services exchanged between the customers. Such network services may include Ethernet or other layer 2 (L2) services, Internet or other layer 3 (L3) services for direct L3 peering between the customers, and/or cloud-based services exchanges whereby the interconnection facility operates as a L3 autonomous system for indirect L3 route exchange between the customers via peering with the L3 autonomous system.

In some examples, "customer" or "tenant" cages located within the interconnection facility are each associated with a customer of the interconnection system provider. The interconnection system provider pre-installs fiber infrastructure for the optical switch fabric of the interconnection facility, including one or more optical fibers, to each customer cage such that the demarcation point between the provider and the customer for the customer cage has a physical coupling with the pre-installed fiber infrastructure for sending and receiving optical signals by way of at least one optical fiber run to the customer cage demarcation point. The programmable network platform, in response to receiving a service request to create a fiber cross-connect between customer cages for respective customers, configures photonic fiber optical switches of the interconnection facility optical switch fabric to create fiber cross connect and switch optical signals through the optical switch fabric between the demarcation points according to one or more optical paths determined by the programmable network platform for the requested fiber cross-connect.

As a result, the techniques may provide an automated fiber cross-connect service for the rapid and automatic establishment of physical fiber level connections between many different types of services (e.g., cloud exchange, Internet exchange, Internet transit) using different network equipment (e.g., routers, switches, and optical dense wave-division multiplexing (DWDM) transport platforms) across the floor of an interconnection facility, between floors, across campuses, and across distributed interconnection facilities within a metro. Such automated fiber-cross connects may be set up remotely and on-demand, with automated provisioning after manual pre-installation of the fiber infrastructure. The techniques may further allow for optical performance monitoring and loopback for trouble shooting, along with reduced CapEx investment due to better utilization of fiber tray space. Short-term, temporary, and/or recurring fiber cross-connects may also be facilitated as a result of the described techniques. One or more of the above advantages may facilitate increasing service growth for the interconnection service provider. In addition, because fiber cross-connects are automatically provisioned rather than using manually-run fiber cabling, the fiber cross-connects may be disconnected automatically as well, and the fiber segments that made up the fiber-cross-connects may be reused for new customers and/or new fiber cross connects, which may alleviate the need to remove fiber cables from cable tray and, as a result, may improve overall SLA satisfaction due to fewer optical fiber cable breakages. Further, by provisioning fiber-cross connects within centrally-managed interconnection facilities not publicly accessible, the techniques may provide better secured, more private, and lower latency connections than a fiber-based connection established over a service provider transport network, for instance.

In some examples, an interconnection system comprises at least one interconnection facility and a programmable network platform, the at least one interconnection facility including: an optical switch fabric having a plurality of optical fibers and a plurality of photonic switches interconnected by the plurality of optical fibers; a first customer cage for a first customer of an interconnection system provider for the interconnection system, the first customer cage having a first fiber patch panel that includes a first provider-side optical port operably coupled to a first optical fiber from the plurality of optical fibers; and a second customer cage for a second customer of the interconnection system provider, the second customer cage having a second fiber patch panel that includes a second provider-side optical port operably coupled to a second optical fiber from the plurality of optical fibers, and the programmable network platform configured to, in response to receiving a fiber cross-connect request that requests an interconnection between the first customer and the second customer, configure the plurality of photonic switches to create an optical fiber cross-connect between the first optical fiber and the second optical fiber to provide an end-to-end optical fiber cross-connect that includes the first optical fiber, the second optical fiber, and the optical fiber cross-connect.

In some examples, a computing device comprises at least one programmable processor operably coupled to a memory; and a programmable network platform configured for execution by the at least one programmable processor to: receive a fiber cross-connect request that requests an interconnection in an interconnection facility between a first customer and a second customer; and in response to receiving the fiber cross-connect request, configure a plurality of photonic switches to create an optical fiber cross-connect between a first optical fiber and a second optical fiber to provide an end-to-end optical fiber cross-connect that includes the first optical fiber, the second optical fiber, and the optical fiber cross-connect, wherein the first customer has a first customer cage located within the interconnection facility and the second customer has a second customer cage located within the interconnection facility, wherein the first customer cage includes a first fiber patch panel that includes a first provider-side optical port operably coupled to the first optical fiber from a plurality of optical fibers interconnecting the plurality of photonic switches to form an optical switch fabric, wherein the second customer cage includes a second fiber patch panel that includes a second provider-side optical port operably coupled to the first optical fiber from the plurality of optical fibers.

In some examples, a method comprises receiving, by a programmable network platform for an interconnection facility, a fiber cross-connect request that requests an interconnection in an interconnection facility between a first customer and a second customer; and configuring, by the programmable network platform in response to receiving the fiber cross-connect request, a plurality of photonic switches to create an optical fiber cross-connect between a first optical fiber and a second optical fiber to provide an end-to-end optical fiber cross-connect that includes the first optical fiber, the second optical fiber, and the optical fiber cross-connect, wherein the first customer has a first customer cage located within the interconnection facility and the second customer has a second customer cage located within the interconnection facility, wherein the first customer cage includes a first fiber patch panel that includes a first provider-side optical port operably coupled to the first optical fiber from a plurality of optical fibers interconnecting the plurality of photonic switches to form an optical switch fabric, wherein the second customer cage includes a second fiber patch panel that includes a second provider-side optical port operably coupled to the first optical fiber from the plurality of optical fibers.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
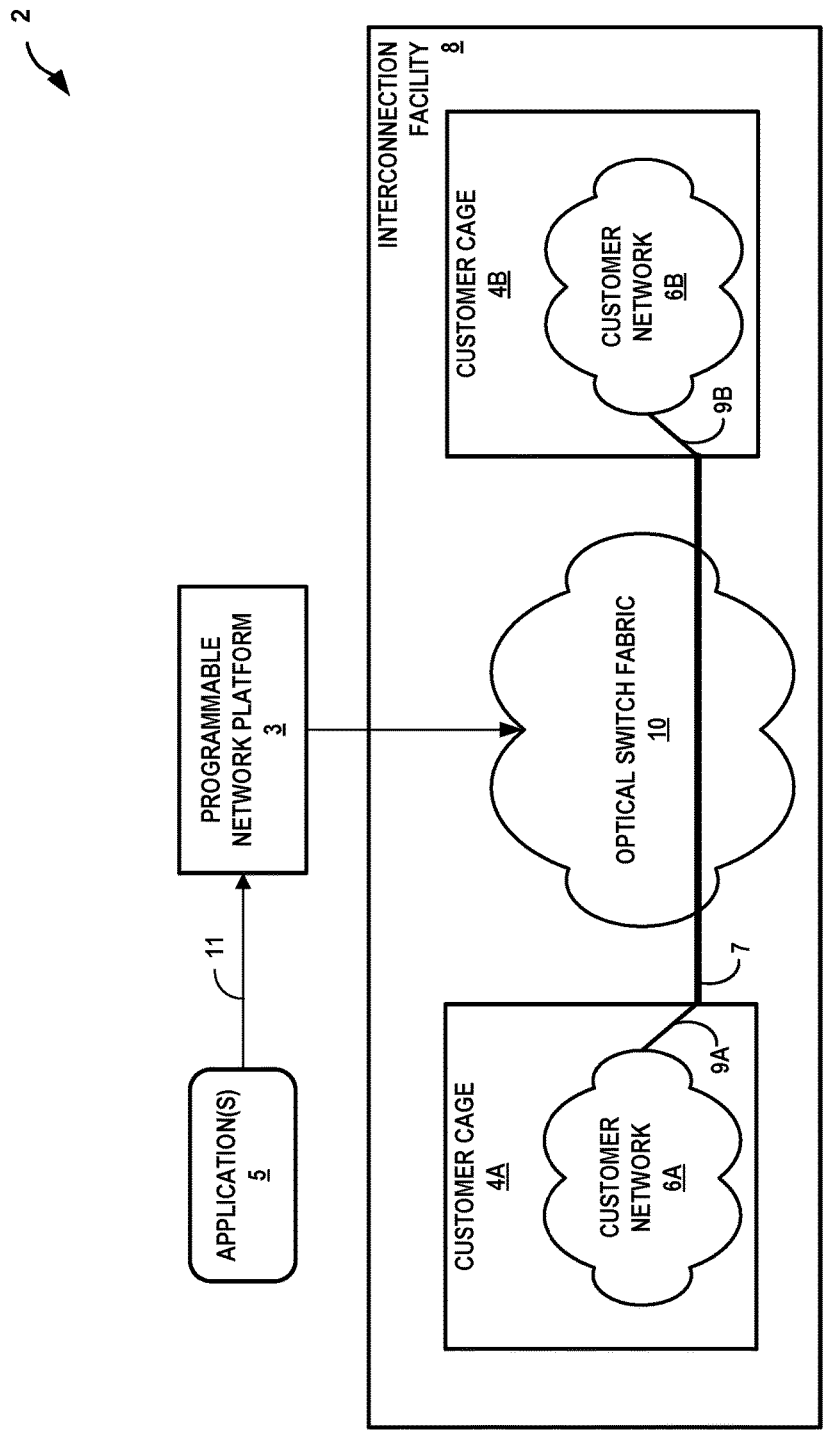
FIG. 1 is a block diagram that illustrates a high-level view of an interconnection system having a programmable network platform that offers automated fiber cross-connects between customer cages of an interconnection facility in accordance with techniques described herein.

FIG. 1 is a block diagram that illustrates a high-level view of an interconnection system 2 having a programmable network platform 3 that offers automated fiber cross-connects between customer cages of an interconnection facility in accordance with techniques described herein. Interconnection system 2 depicts an interconnection facility 8 operated by an interconnection system provider, the interconnection facility 8 having an optical switch fabric 10 configurable for cross-connecting customer networks 6A-6B (collectively, "customer networks 6") located within multiple customer cages 4A-4B (collectively, "customer cages 4"). In some instances, each of customer cages 4 may be associated with a different customer of the interconnection system provider. In some instances, customer cages 4 are both associated with a single customer of the interconnection system provider. As used herein, the term "customer" of the interconnection system provider may refer to a tenant of the interconnection facility 8 deployed by the interconnection system provider, whereby the customer leases space within the interconnection facility 8 in order to co-locate with other tenants for improved efficiencies over independent facilities as well as to interconnect network equipment with the other tenants' network equipment within the interconnection facility or campus for reduced latency/jitter and improved reliability, performance, and security versus transport networks, among other reasons. The interconnection system provider may in some cases be referred to as an interconnection facility provider in that these will typically be the same entity.

In the interconnection facility 8, space may be partitioned and leased to customers in flexible increments in the form of cages (an area of a common floor space enclosed by a fence or other demarcation), cabinets, racks, suites (an enclosed room that is not part of a common floor space), or other space in which customers may situate their network equipment to provide and/or receive network services to/from other customer(s) co-located in the interconnection facility 8. Although illustrated and primarily described with respect to customer cages 4 in interconnection facility 8, the techniques of this disclosure are similarly applicable for automatically cross-connecting customer equipment distributed within an interconnection facility 8 (or distributed interconnection facilities) in various space factors, such as those identified above.

Each of cages 4 are installed by the interconnection system 2 provider and provide a secure structure and location for a customer to store and access their customer network, while also having access to optical network infrastructure 10, e.g., via a customer side of a fiber patch panel (not shown) situated within the cage 4 mesh that defines a cage boundary or "demarcation" within the interconnection facility, in that the customer alone has access to the cage interior. Such fiber patch panels (more simply and hereinafter, "panels") may also provide the interconnection system 2 provider with convenient and secure access to a provider side of the panels. For example, the provider may be able to access the provider-sides of panels for cages 4 without accessing the interior of cages 4. Likewise, the customers leasing or otherwise having access to the interiors of cages 4 may be able to access the customer sides of panels but may be prevented from accessing the provider sides of panels. In some examples, the provider may able to access a secure hallway between cages 4, which may allow access to the provider side of the panels.

In accordance with techniques described in this disclosure, optical switch fabric 10 represents optical and photonic switching infrastructure that is remotely configured by programmable network platform 3 to automatically create a fiber cross-connect 7 that connects customer cage 4A and customer cage 4B. As described in further detail below, optical switch fabric 10 includes pre-installeded optical fiber between customer cages 4 and at least one distribution facility (or "distribution frame") of the interconnection facility 8 and may further include pre-installed optical fiber between multiple distribution facilities of the interconnection facility 8. Optical switch fabric 10 further includes programmable photonic switches located within distribution facilities of the interconnection facility 8 and/or located at the demarcation of customer cages 4.

System 2 further includes a programmable network platform (PNP) 3, alternatively referred to herein as an "interconnection platform." Programmable network platform 3 may expose a software interface that defines the methods, fields, and/or other software primitives by which application(s) 5 may invoke PNP 3 to dynamically provision a fiber cross-connect 7 between customer cages 4A, 4B. In this way, PNP 3 allows customers, carriers, network service providers (NSPs), and/or the interconnection system provider itself with the programmatic capability of configuring optical switch fabric 10 to interconnect customer cage 4A to customer cage 4B with fiber cross-connect 7.

Programmable network platform 3 may represent an application executing within one or more data centers of system 2 or alternatively, off-site/remotely at a back office or branch of the interconnection system 2 provider, for instance. Although shown as administering a single interconnection facility 8, programmable network platform 3 may control service provisioning for multiple different interconnection facilities. Alternatively or additionally, multiple separate instances of the programmable network platform 3 may control service provisioning for respective multiple different interconnection facilities.

Application(s) 5 represents at least one application that communicates with PNP 3 to request and dynamically provision fiber cross-connect 7 within optical switch fabric 10 and establish fiber-based connectivity between customer cages 4A, 4B. Application(s) 5 represent client-side software for interfacing with PNP 3 and may include a customer portal, customer applications, an interconnection system 2 provider application that is accessible only to interconnection facility 8 operators, a console such as a command-line interface or graphical user interface. Users or clients of application(s) 5 may include enterprise customers, cloud service and content providers, carriers, network service providers (NSPs), and/or the interconnection system provider itself, for instance.

An application of application(s) 5 issues, to PNP 3, a fiber cross-connect request 11 that specifies parameters for a fiber cross-connect between customer cages 4A, 4B. Fiber cross-connect request 11 may specify, for instance, an optical signal profile including a bandwidth or data rate and protocol, a start time at which the requested fiber cross-connect should be operational, an end time at which the requested fiber cross-connect should be torn down (potentially indefinite until the contract term expires), and port identifiers for panel ports at demarcation panels of customer cages 4A, 4B.

In response to fiber cross-connect request 11, PNP 3 determines an optical path through optical switch fabric 10 and dynamically provisions fiber cross-connect 7 in optical switch fabric 10 to provide fiber-based interconnection between customer cages 4A, 4B to satisfy the fiber cross-connect request 11. PNP 3 may determine the optical path through optical switch fabric 10 by identifying pre-installed but unused fiber that connect to unused ports on photonic switch connections that together make up an end-to-end optical path between customer cages 4A, 4B. In some examples, a mesh of photonic switches make up the optical switch fabric 10 of the interconnection facility or facilities.

PNP 3 configures elements of optical switch fabric 10 by issuing configuration commands either directly to such elements by way of configuration interfaces of the elements, or indirectly to such elements via software-defined networking (SDN) controllers that manage the elements on behalf of the PNP 3. PNP 3 may in some instances be alternatively referred to as an orchestrator in that PNP 3 orchestrates SDN controllers so as to configure photonic switches and/or other elements of optical switch fabric 10 to establish fiber cross-connect 7.

Fiber cross-connect 7 may represent a Layer 0 ("L0") connection in that the fiber cross-connect underlies the Open Systems Interconnection (OSI) model or TCP/IP model for packet networking. In particular, fiber cross-connect 7 may underlie an optical transport network (OTN) layer that (typically in conjunction with a SONET/SDH layer) provides Layer 1 ("L1") connectivity between optical networking devices such as wavelength division multiplexing (WDM) devices. For instance, fiber cross-connect 7 may represent one or more wavelengths (or "lambdas") photonically switched by elements of optical switch fabric to provide an optical path (or "light path") for optical signals exchanged between customer cages 4A, 4B associated with different customers/tenants of the interconnection system 2 provider. In this way, optical switch fabric 10 is configured to provide non-blocking switching by way of a high-speed fiber connection between respective customers cages 4A, 4B for the customers of the interconnection system 2 provider and, in doing so, may provide reliable and low-latency communication between the respective demarcation points of the customer cages 4A, 4B.

Customer networks 6A, 6B use respective access links 9A, 9B to access fiber cross-connect 7 to exchange data. Access links 9A, 9B may represent, in some instances, grey links/optics, in which a router or switch of customer networks 6A, 6B exchanges grey (uncolored) optical signals with a transponder that converts between a grey optical signal and an optical signal at a specific wavelength (color) exchanged with a WDM device of optical switch fabric 10. Fiber cross-connect 7 may in some cases underlie a layer 2 ("L2") or layer 3 ("L3") service provided by the interconnection system 2 provider to interconnect customer cages 4A, 4B according to an L2 or L3 service. For example, interconnection facility 8 may operate a network services exchange, such as Ethernet Exchange, and Internet Exchange, and/or a Cloud Exchange, and each of these may make use of dynamically-provisioned fiber cross-connect 7 to transmit L2/L3 packet data between customer networks 6A, 6B.

Further example details of a facility that provides a cloud-based services exchange are found in U.S. Provisional Patent Application 62/149,374, filed Apr. 17, 2015 and entitled "Cloud-Based Services Exchange;" U.S. Provisional Patent Application 62/072,976, filed Oct. 30, 2014 and entitled "INTERCONNECTION PLATFORM FOR REAL-TIME CONFIGURATION AND MANAGEMENT OF A CLOUD-BASED SERVICES EXCHANGE;" and in U.S. Provisional Patent Application 62/160,547, filed May 12, 2015 and entitled "PROGRAMMABLE NETWORK PLATFORM FOR A CLOUD-BASED SERVICES EXCHANGE;" each of which are incorporated herein by reference in their respective entireties.

Further example details of a facility that provides a carrier Ethernet exchange are found in U.S. Pat. No. 8,537,845 entitled "REAL TIME CONFIGURATION AND PROVISIONING FOR A CARRIER ETHERNET EXCHANGE", filed Sep. 13, 2012; U.S. Utility Application titled "REAL TIME CONFIGURATION AND PROVISIONING FOR A CARRIER ETHERNET EXCHANGE" filed on Sep. 2, 2010 having application Ser. No. 12/875,054; U.S. Provisional Application titled "ETHERNET EXCHANGE" filed on Dec. 10, 2009 having application Ser. No. 61/285,371; U.S. Provisional Application titled "PRIVATE NETWORK CONNECTIVITY PLATFORM" filed on Sep. 4, 2009 having application Ser. No. 61/239,997; U.S. Provisional Application titled "ETHERNET EXCHANGE" filed on Apr. 12, 2010 having application Ser. No. 61/323,066; U.S. Patent Application titled "REAL TIME CONFIGURATION AND PROVISIONING FOR A CARRIER ETHERNET EXCHANGE" filed on Sep. 2, 2010 having application Ser. No. 12/875,054. Each of the above patents and patent applications are incorporated herein by reference in their respective entireties. Interconnection facility 8 may provide both an Ethernet exchange and a cloud-based services exchange, in some examples.

As a result of dynamically provisioning a fiber cross-connect between customer cages 4A, 4B, the techniques may provide rapid and automatic physical fiber level connection between customer networks to facilitate interconnectivity among different customers of the interconnection system 2 provider. As a result, the techniques may provide rapid and automatic physical fiber level connection between many different types of network equipment (e.g., routers, switches, and optical dense wave-division multiplexing (DWDM) transport platforms) of different customer networks 6 across the floor of an interconnection facility, between floors, across campuses, and across distributed interconnection facilities within a metro. As described herein, PNP 3 may provision fiber cross-connect 7 remotely and on-demand, after manual pre-installation of the fiber infrastructure. The techniques may further allow for optical performance monitoring and loopback for trouble shooting, along with reduced CapEx investment due to better utilization of fiber tray space. Short-term, reuse, temporary, and/or recurring instances of fiber cross-connect 7 may also be facilitated as a result of the described techniques. One or more of the above advantages may facilitate service growth for the interconnection service provider that deploys interconnection facility 8 to interconnect multiple tenants therein. In addition, because fiber cross-connect 7 is automatically provisioned rather than manually run, the fiber cross-connect 7 may be disconnected automatically as well, which may alleviate the need to remove fiber cables from cable tray and, as a result, may improve overall SLA satisfaction due to fewer optical fiber cable breakages.

Figure 2A:
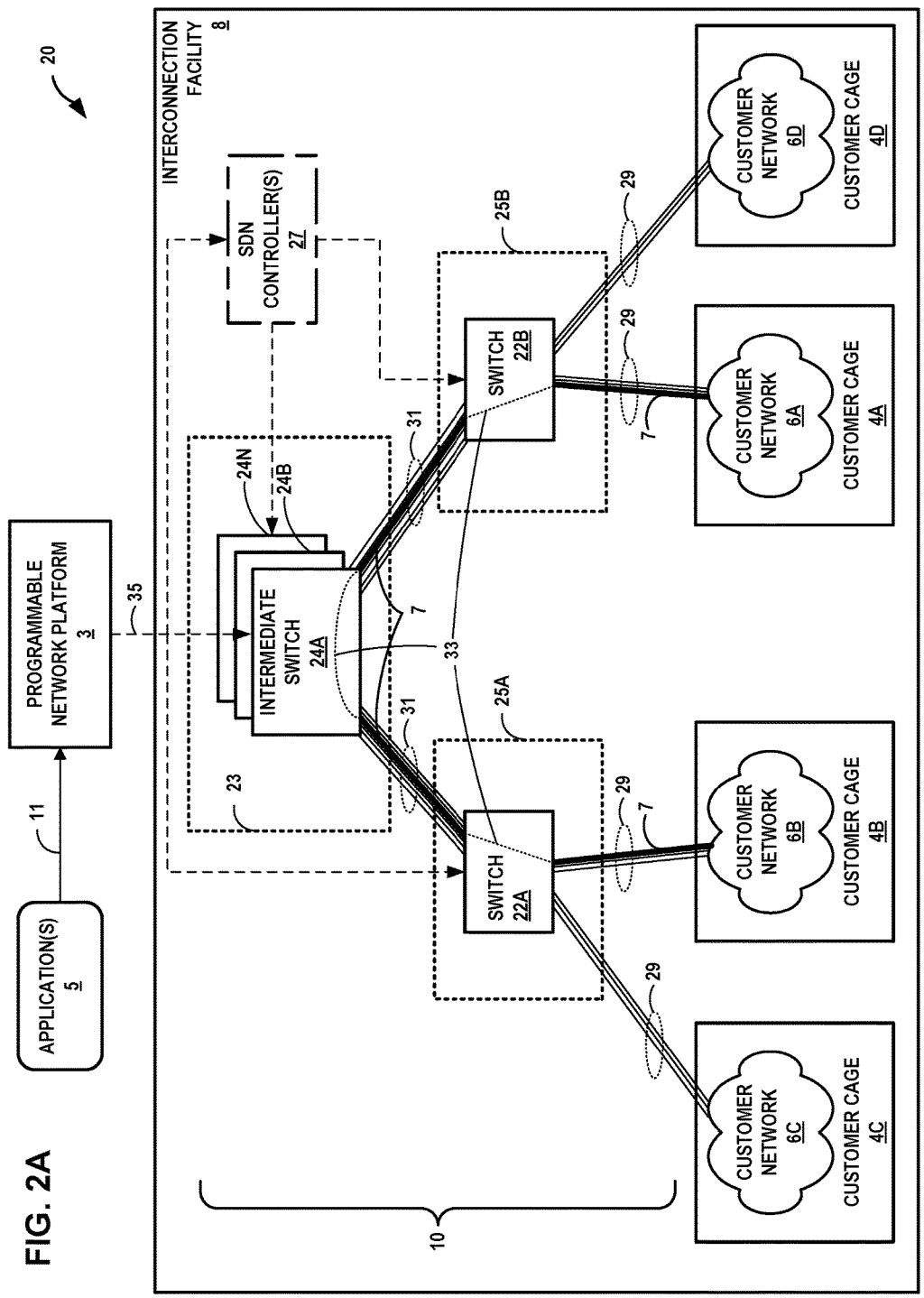
FIGS. 2A-2B are block diagrams that illustrate, in further detail, an interconnection system having a programmable network platform that offers automated fiber cross-connects between customer cages of an interconnection facility in accordance with techniques described herein.
Figure 2B:
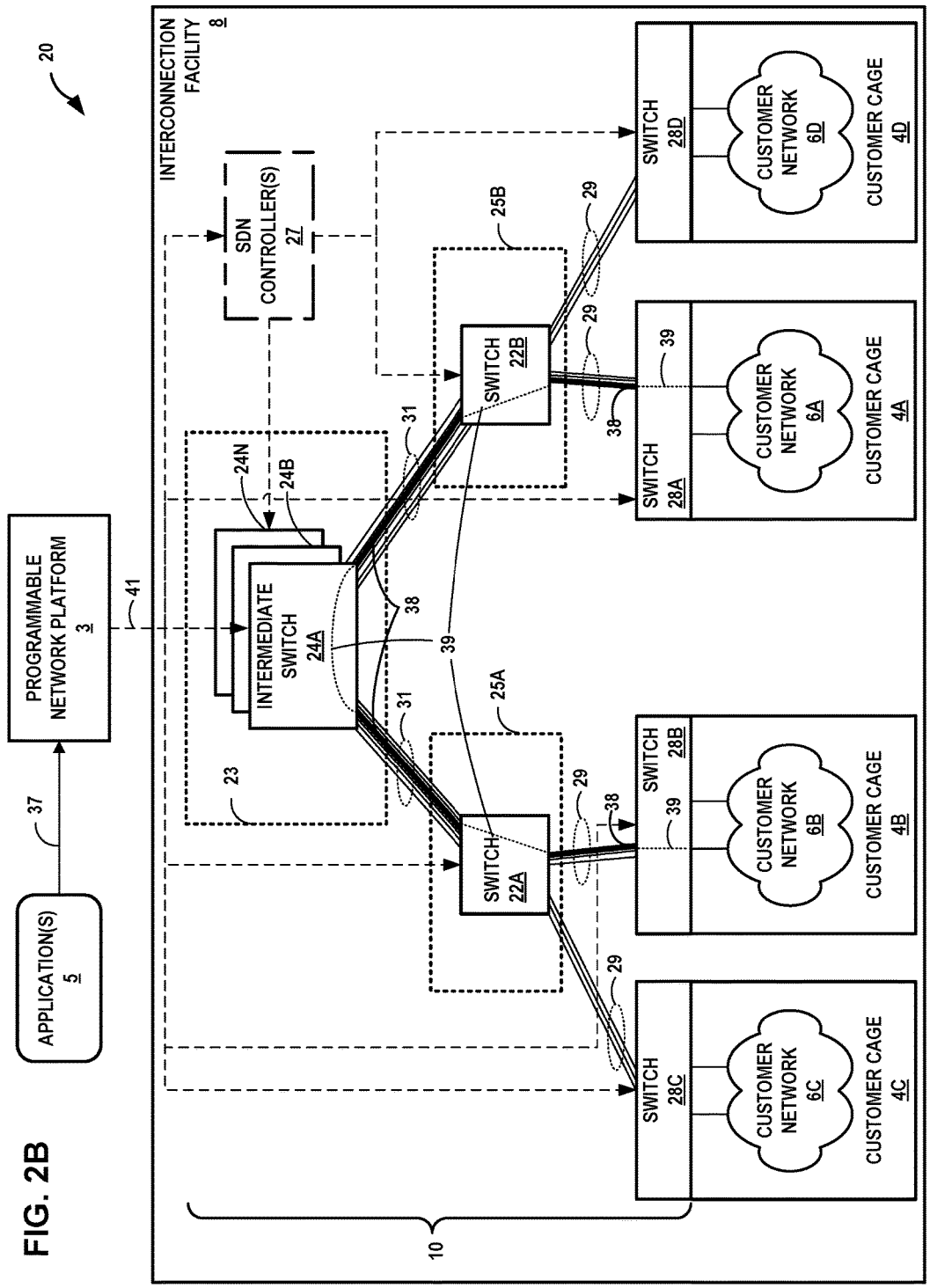

FIGS. 2A-2B are block diagrams that illustrate, in further detail, an interconnection system having a programmable network platform that offers automated fiber cross-connects between customer cages of an interconnection facility in accordance with techniques described herein. Interconnection system 20 of FIGS. 2A-2B depicts an interconnection facility 8 operated by an interconnection system provider and may represent an example of interconnection facility 8 of FIG. 1. In this example, the optical switch fabric 10 of interconnection facility 8 includes multiple distribution facilities (or "distribution frames") 23 and 25A-25B each having one or more photonic switches 24A-24N (collectively, "photonic switches 24") and photonic switches 22A-22B (collectively, "photonic switches 22") arranged, e.g., hierarchically or as a flat mesh and configured to switch optical signals so as to implement fiber cross-connects dynamically provisioned in interconnection facility 8 by PNP 3. Photonic switches 24, 22 may include large port-count switches. Main distribution facility 23 and intermediate distribution facilities 25 may be located within infrastructure cages accessible within interconnection facility 8 only to the facility provider.

Other examples of interconnection facility 8 may include more or fewer components to those illustrated and described herein. For example, interconnection facility 8 may include additional customer cages 4, intermediate distribution frames 25, switches 22 and 24, and so forth.

Each of photonic switches 22, 24 may represent a photonic cross connect (PXC), optical cross-connect (OXC), optoelectronic based switch (OEO), or other types of devices that switch optical signals. Each of photonic switches 22, 24 may route optical signals (light beams or lambdas) between optical fibers coupled to the switch. Programmable network platform 3 configures photonic switches 22, 24 to switch optical signals along optical paths, each optical path beginning at an optical transmitter and terminating at an optical receiver and each of the optical transmitter and optical receiver being associated with one of customer cages 4. In this way, customer networks 6 in the customer cages 4 may exchange frames and packets for L0/L1/L2/L3 services via dynamically provisioned fiber cross-connects. An optical path may alternatively be referred to as an optical path, a light path, a lambda or an optical transport network wavelength, or a composite DWDM optical signal. Example bandwidths for an optical path for a cross-connect may include, e.g., 2.5 Gbps, 10 Gbps, 40 Gbps, 100 Gbps, 400 Gbps, or even multi-terabit DWDM optical signals. An optical fiber may include multiple optical paths, i.e., the optical fiber may transport optical signals for multiple optical paths as different lambdas, for instance. Optoelectronic-based switches may limit switching applications according to the data rate, protocol, and format supported by the electronic components of switches.

Photonic switches 22, 24 include respective sets of ports that may be cross-connected within the photonic switch in order to create an optical transmission path within the switch between two of the ports, according to a configuration of the switch. Each of photonic switches 22, 24 includes a configuration interface to receive configuration data that specifies intra-switch cross-connects between ports of the switch. An optical transmission path between two ports of the switch exists if an optical signal applied to one of the ports is received at the other port for transmission via an optical fiber coupled to the port, or to a grey optic, an integrated OADM/ROADM, and so forth. Transmission paths within a switch can be unidirectional or bidirectional.

Optical switch fabric 10 includes pre-installed optical fiber bundles 29, 31 to couple switch ports of photonic switches 22, 24 of the optical switch fabric 10 and to couple switches 22 to customer networks 6. Main distribution facility 23 interconnects and manages optical fiber bundles 31 pre-installed by the interconnection system 2 provider to couple ports of photonic switches 22 to ports of intermediate switches 24. Intermediate distribution facilities 25 interconnect and manage optical fiber bundles 29 pre-installed by the interconnection system 2 provider to couple ports of photonic switches 22 to customer cages 4. Any of optical fiber bundles (multiple fiber strands per bundled cable) 29 may in some cases represent a single optical fiber or duplex fiber cable run between a customer cage 6 and one of photonic switches 22.

In some examples, optical fiber bundles 29, 31 represent one or more MPO/MTP trunk cables, each trunk cable having multiple fibers. In some examples, the trunk cables have staggered pigtail lengths either pre-terminated with a suitable connector type or with field termination option since fiber run lengths are not know a priori and at least in some cases include a common connector. For instance, optical fiber bundle 29 coupling customer cage 4B and switch 22A may represent a 12-, 24-, 48-, 72-, or 144/288-fiber trunk cable. Pre-installing trunk fibers in this manner produces reduced insulation/shielding per-fiber and may allow reclamation of fiber tray space for vertical and/or horizontal fiber trays installed by the facility provider to carry optical fiber throughout the interconnection facility 8. Reclaimed fiber space may in some cases be repurposed for additional tenant space to improve revenue per square foot for the facility provider. For example, the techniques may permit 6" troughs on the side of cabinets instead of 10" or 12" troughs for fiber management, thereby saving inches of horizontal floor space per cabinet or rack. Further and in combination with the dynamic fiber cross-connect provisioning aspects described in this disclosure, this may reduce installs and de-installs for fiber cabling and also reduce trunk cable splicing.

In some examples, fibers of fiber bundles 29, 31 may include single-mode or multi-mode optical fibers. For instance, optical switch fabric 10 may include a multi-mode fabric with photonic/optically transparent switches. Alternatively, ROADM and WDM devices may be used in optical switch fabric 10 with single-mode fibers/cables.

In the example of FIG. 2A and in accordance with techniques described herein, programmable network platform 3 directly configures photonic switches 22, 24 in order to create an end-to-end fiber cross-connect 7 between different customer cages for different tenants of the interconnection facility 8, the fiber cross-connect including at least one fiber from optical fiber bundle 29 coupling a port for customer cage 4B and a port of switch 22A, a configured transmission path 33 in switch 22A, at least one fiber from optical fiber bundle 31 coupling a port of switch 22A and a port of intermediate switch 24A, the configured transmission path 33 in intermediate switch 24A, at least one fiber from optical fiber bundle 31 coupling a port of switch 22B and a port of intermediate switch 24A, the configured transmission path 33 in switch 22B, and at least one fiber from optical fiber bundle 29 coupling a port of customer cage 4A and a port of switch 22B. In this way, fiber cross-connect 7 is dynamically configured to transport optical signals in an optical transmission path made up of an end-to-end optical transmission medium that includes multiple optical fiber segments stitched together by programmable network platform 3. The fiber cross-connect 7 may operate at Layer 0 to switch lambdas/beams for switching optical signals so as to underlie the Layer 1 (physical) layer of the OSI or TCP/IP models, for instance.

To configure transmission paths 33 in photonic switches 22, 24A, programmable network platform 3 may issue configuration commands 35 to a configuration interface for the switch. Each of configuration commands 35 represents a command to direct the receiving switch to create an optical transmission path between two switch ports specified by the command. In response to receiving a configuration command 35, the receiving switch creates the specified optical transmission path and is in this way configured to switch optical signals.

Programmable network platform 3 may further facilitate L2/L3 services, such as L2VPNs, L3VPNs, that use fiber cross-connect 7 to transport optical signals for packetized data exchanged between customer cages 4A, 4B.

In some examples, interconnection facility 8 or an off-site environment includes one or more software-defined networking (SDN) controller(s) 27 to configure photonic switches 22, 24. SDN controllers 27 may present a uniform interface for switch configuration to PNP 3 while configuring photonic switches 22, 24 using vendor-specific protocols or methods in instances of interconnection facility having switches 22, 24 manufactured by multiple different vendors, each such vendor further manufacturing one of the SDN controller(s) 27 to manage the switches associated with the vendor. Programmable network platform 3 orchestrates SDN controller(s) 27 to configure switches 22, 24 with optical transmission paths 33 in order to establish fiber cross-connect 7. Alternatively, the interconnection provider's own SDN controller and PNP together with the provider's network back office infrastructure can directly interface with the switches using south bound interfaces and/or commands.

In the example of FIG. 2B, customer cages 4 include respective active demarcation panels that may include respective photonic switches 28 configurable by PNP 3 (directly or via SDN controller(s) 27) to dynamically configure requested fiber cross-connects between customer-side ports of panels for respective customer cages 4. Like switches 22, 24, photonic switches 28A-28D (collectively, "photonic switches 28") of optical switch fabric 10 may each represent a PXC/OXC, OADM/ROADM, multiplexing device, or other type of device that switches optical signals. Example details for an active demarcation fiber patch panel are found in U.S. Provisional Patent Appl. No. 62/164,965, filed May 21, 2015 and entitled "ACTIVE PANEL DEMARCATION," the entire content of which is incorporated by reference in its entirety.

FIGS. 2A-2B illustrate example control configurations in which some photonic switches 22, 24, and 28 are configured by SDN controller(s) and some are configured by PNP 3. Other control configurations may exist in various implementations. In some examples, PNP 3 may indirectly configure optical switch fabric 10 entirely via SDN controller(s) 27. In other examples, PNP 3 may directly configure optical switch fabric 10.

"Customer-side" ports refers to ports accessible to the customer. For example, switch 28A may be located within a demarcation panel or otherwise located in a demarcation area of customer cage 4A. Customer networks 6 may each include multiple access links that couple to the optical switch fabric 10 of interconnection facility 8 at customer-side ports of respective photonic switches 28. In other words, each of photonic switches 28 may include multiple customer-side ports each coupled via an optical fiber to corresponding customer network 6 network equipment, such as an OADM/ROADM/WDM Mux/Demux or an L2/L3 switch or router having an integrated optical interface (gray optics or WDM). "Provider-side" ports may refer to ports of photonic switches 28 accessible to the interconnection system 2 provider and coupled via optical fiber to one of switches 22 in one of intermediate distribution facilities 25. Optical ports may also be referred to as optical interfaces.

In the example of FIG. 2B having customer cage 4-based photonic switches 28, an application of application(s) 5 issues, to PNP 3, a fiber cross-connect request 37 that specifies parameters for a fiber cross-connect between customer cages 4A, 4B. Fiber cross-connect request 37 may specify, for instance, bandwidth or signal type/data protocol on the fiber, a start time at which the requested fiber cross-connect should be operational, an end time at which the requested fiber cross-connect should be torn down, and port identifiers for customer-side ports for switches 28A, 28B.

In response to fiber cross-connect request 37, PNP 3 determines an optical path through optical switch fabric 10 and dynamically provisions fiber cross-connect 38 in optical switch fabric 10 to provide fiber-based interconnection between the specified customer-side ports of switches 28A, 28B of respective customer cages 4A, 4B to satisfy the fiber cross-connect request 37. PNP 3 may determine the optical path through optical switch fabric 10 by identifying pre-installed but unused fiber (or lambdas for such fiber) and photonic switch connections that together make up an end-to-end optical path between the customer-side ports specified in fiber cross-connect request 37. PNP 3 configures photonic switches 28A, 22B, 24A, 22A, and 28B to establish transmission paths 39 through the switches to switch optical signals between respective pairs of ports of the switches identified by PNP 3.

In this way, programmable network platform 3 directly configures photonic switches 22, 24, 28 in order to create an end-to-end fiber cross-connect 38 between different customer cages 4A, 4B for different tenants of the interconnection facility 8, the fiber cross-connect including a configured optical transmission path 39 in switch 28B, at least one fiber from optical fiber bundle 29 coupling a provider-side port for switch 28B and a port of switch 22A, a configured transmission path 39 in switch 22A, at least one fiber from optical fiber bundle 31 coupling a port of switch 22A and a port of intermediate switch 24A, the configured transmission path 39 in intermediate switch 24A, at least one fiber from optical fiber bundle 31 coupling a port of switch 22B and a port of intermediate switch 24A, the configured transmission path 39 in switch 22B, at least one fiber from optical fiber bundle 29 coupling a port of customer cage 4A and a provider-side port of switch 22B, and a configured optical transmission path 39 in switch 28A. In this way, fiber cross-connect 38 is dynamically configured to transport optical signals in an optical transmission path made up of an end-to-end optical transmission medium that includes multiple optical fiber segments stitched together through optical switch fabric 10 by programmable network platform 3. The fiber cross-connect 38 may operate at Layer 0 to switch lambdas/beams for switching optical signals so as to underlie the Layer 1 (physical layer), Layer 2 (link layer) and Layer 3 (network or routing layer) of the OSI or TCP/IP models, for instance. Alternatively, for customer demarcation panels having static/inactive fiber patch panels, prewired fiber bundles to switches in IDFs and MDFs can accomplish the same fiber cross connections directed by PNP 3, but a one to one mapping is required between customer demarcation fiber panels and switches in IDFs/MDFs for optical fibers or and fibers in fiber bundles.

Figure 3:
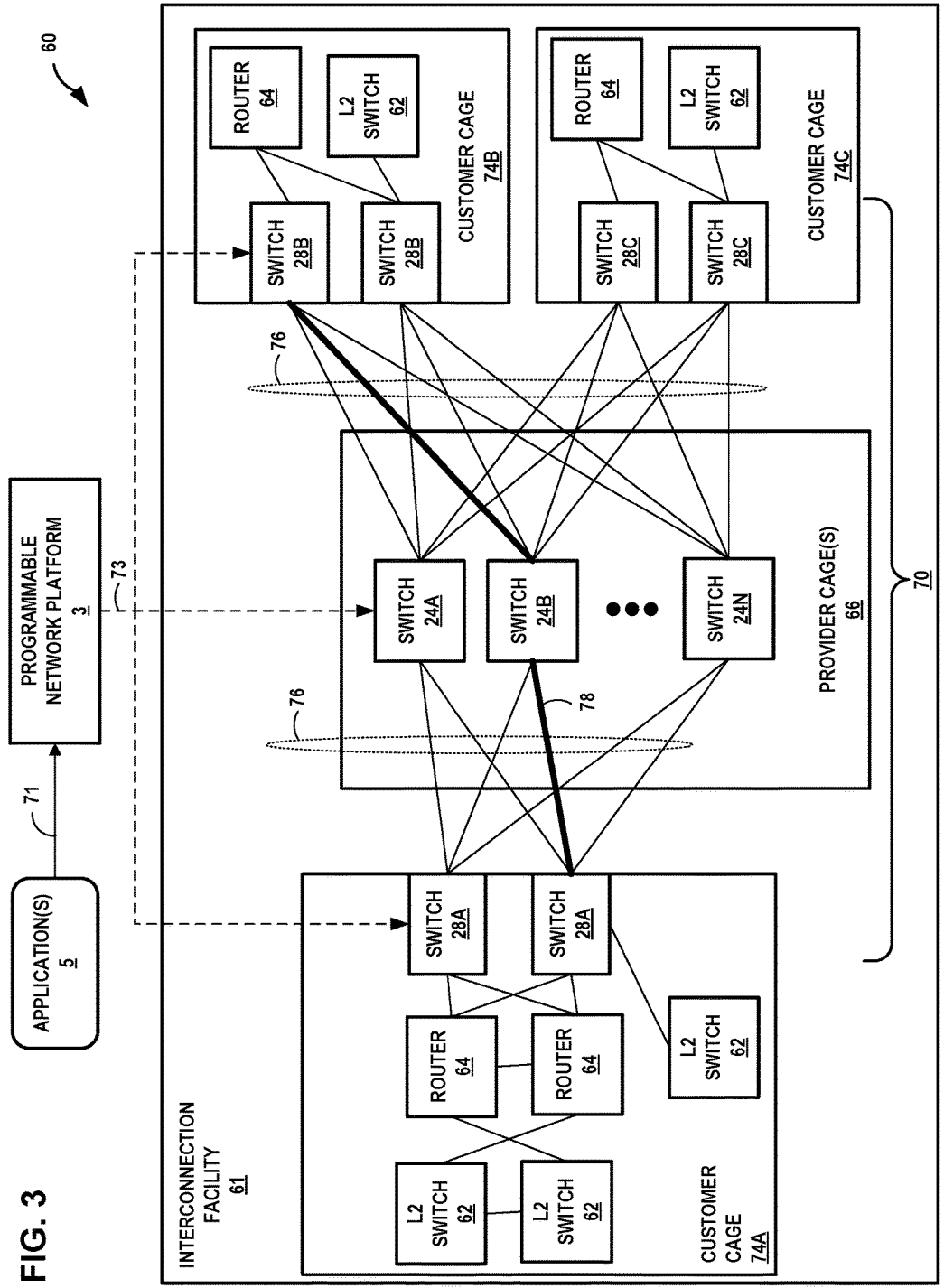
FIG. 3 is a block diagram that illustrates an example interconnection system having a programmable network platform that offers automated fiber cross-connects between customer cages of an interconnection facility in accordance with techniques described herein.

FIG. 3 is a block diagram that illustrates an example interconnection system having a programmable network platform that offers automated fiber cross-connects between customer cages of an interconnection facility in accordance with techniques described herein. Interconnection facility 60 may represent an example instance of any of interconnection facilities 8 of FIGS. 1, 2A, and 2B, for instance.

Interconnection facility 61 includes a distributed data center optical switch architecture in which photonic switches of optical switch fabric 70 distributed throughout one or more data centers may switch optical signals between customer cages in accordance with a fiber cross-connect service (alternatively, an "automated optical connection service").

Customer cages 74 may represent example instances of customer cages 6, each having customer networks illustrated in further detail. For example, customer cage 74A includes a customer network having routers 64 (alternatively, L3 switches) and L2 switches 62 arranged to connect to photonic switches 28A located in a demarcation or other area of customer cage 74A to receive and transmit optical signals via optical access links. Fiber bundles 76 represent fiber bundles, such as MPO fiber bundles, that couple ports of switches 28 with intermediate switches 24 of provider cages 66.

Programmable network platform 3, in response to receiving fiber-cross connect request 71 from an application of application(s) 5, identifies an optical transmission path through optical switch fabric 70. Programmable network platform 3 sends configuration data 73 (directly or indirectly via SDN controller(s) (not shown)) to switches 28, 24 of optical switch fabric 70 in order to dynamically establish fiber cross-connect 78 between respective customer-side ports for customer cages 74A and 74B. Network equipment of customer cages 74A and 74B may, after the provisioning of fiber cross-connect 78, exchange frames or packets directly or according to a L2 or L3 interconnection system provider service, the frames or packets being at least in part optically transported by optical switch fabric 70 and in particular the optical fiber that makes up fiber cross-connect 78. Interconnection facility 61 may include multiple data centers in a metropolitan area connected by, e.g., dark fiber not fully utilized or using DWDM optical transport and configured by PNP 3 to transport optical signals between photonic switches 24 of different data centers.

Figure 4:
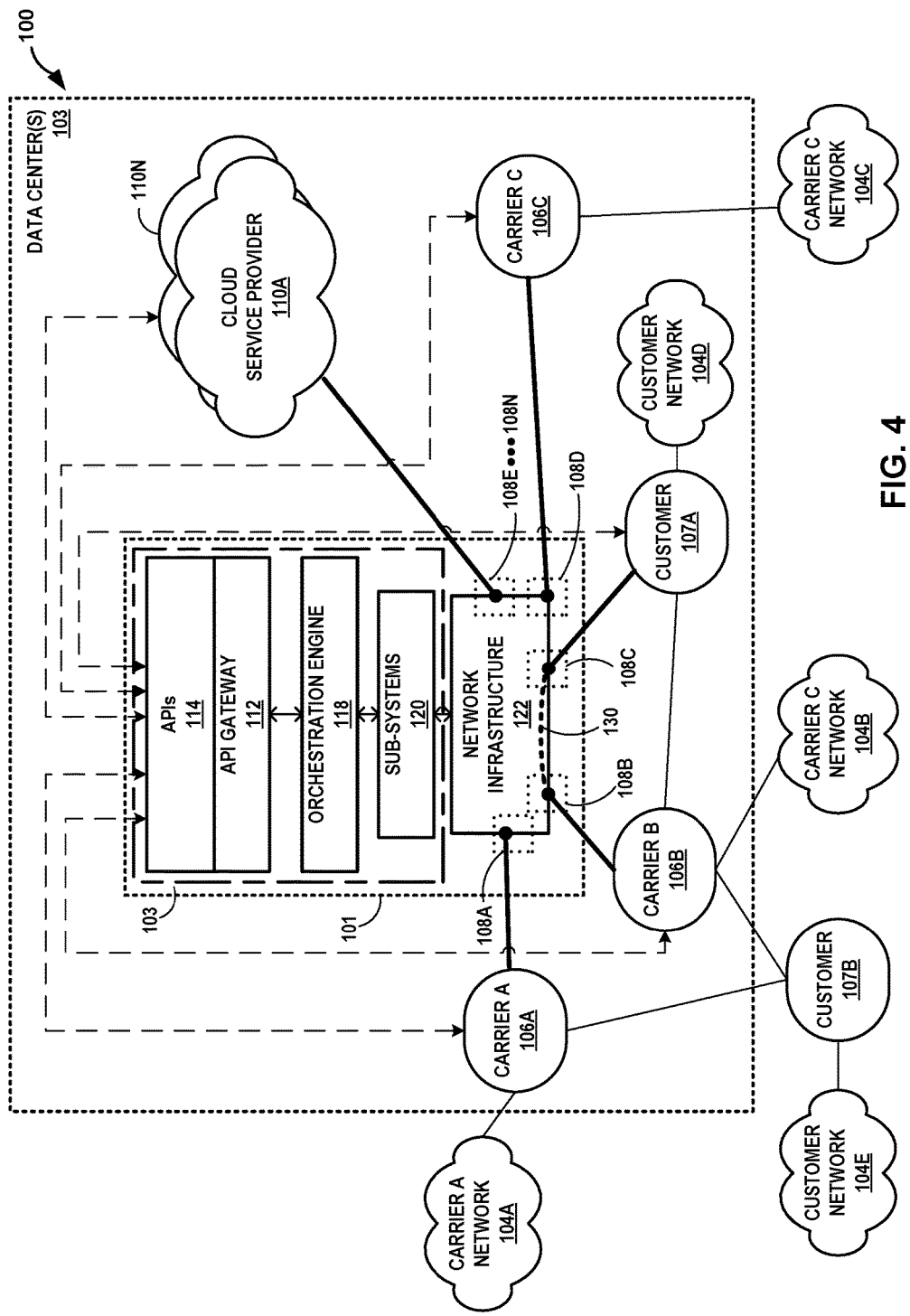
FIG. 4 is a block diagram illustrating an interconnection system in which one or more data centers provide an operating environment for an interconnection facility, in accordance with techniques described herein.

FIG. 4 is a block diagram illustrating an interconnection system in which one or more data centers 105 ("data center(s) 105") provide an operating environment for an interconnection facility 101, in accordance with techniques described herein. In the example of FIG. 4, interconnection system 10 includes interconnection facility 101 and programmable network platform 103, which may represent example instances of interconnection facility 8, 61 and PNP 3, respectively.

According to techniques described in this disclosure, interconnection facility 100 allows a corresponding one of customer networks 104D, 104E and carrier networks 104A-104C (collectively, "private networks 104") of any carriers 106A-106C (collectively, "carriers 106") or other customers of the interconnection system provider (including customers 107A, 107B) to request that PNP 103 provision a fiber cross-connect between the customer's associated fiber patch panel 208 and the fiber patch panel 208 of another customer cage in order to allow the direct exchange of optical signals among the customer networks and CSPs 110, for instance, in order to facilitate a cloud-based services exchange. Further details of cloud-based services exchanges are found in U.S. Provisional Patent Application 62/149,374, referenced above.

Carriers 106 may each represent a network service provider that is associated with a transit network by which network subscribers of the carrier 106 may access cloud services offered by CSPs 110 via the communication facility 100. In general, customers of CSPs 110 may include network carriers, large enterprises, managed service providers (MSPS), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the communication facility 100.

Fiber patch panels 108A-108N (collectively "panels 108") may each represent a demarcation point between a carrier 106, customer 107A, 107B, and CSP 110 and the interconnection system provider. Interconnection facility 101 includes network infrastructure 122 that provides an optical switch fabric and in some instances may provide a L2/L3 switching fabric by which CSPs 110 and customers/carriers interconnect. This enables a carrier/customer to create interconnections to multiple CSPs 110 via a connection to a fiber patch panel 108 and the provisioning of the interconnections by the interconnection system provider using PNP 3. In other words, instead of having to establish separate connections across transit networks to access different cloud service providers or different cloud services of one or more cloud service providers, interconnection facility 101 allows customers to interconnect to multiple CSPs 110 and cloud services using network infrastructure 122 within data center(s) 105.

In some examples, APIs 114 facilitate machine-to-machine communication to enable dynamic and on-demand provisioning of fiber cross-connects in the metro-wide infrastructure for interconnecting customer and cloud service provider or other provider networks. In this way, programmable network platform 103 enables the automation of aspects of fiber cross-connect provisioning. For example, the software interfaces may provide an automated and seamless way for customers to establish, de-install and manage provisioned ports of panels 108 and interconnection with multiple, different cloud service providers 110 co-located in data center(s) 105.

In some examples, PNP 103 includes an API gateway 112 having one or more processors that executes one or more applications that expose software interfaces defined according to APIs 114. The applications may invoke services that correspond to endpoints of the APIs 114, and the services may themselves invoke the programmable network platform service of orchestration engine 118. API gateway 112 may execute on a management device such as one or virtual machines and/or real servers of data center(s) 105. Although shown as a single element in FIG. 4, API gateway 112 may comprise a cluster of one or more physical and/or virtual computing machines executing on one or more physical processors.

In some examples, PNP 103 includes an orchestration engine 118 that organizes, directs and integrates underlying software sub-systems 120 for managing various aspects of interconnection within the network infrastructure 122 including provisioning of the optical switch fabric to establish fiber cross-connects and, in some cases, managing cloud services. The orchestration engine 118 may, for example, provide a rule-driven workflow engine that operates between the APIs 114 and the underlying programmable network platform 103 that includes sub-systems 120 and network infrastructure 122. In this way, the orchestration engine 118 can be used by customer-proprietary applications and the APIs 114 for direct participation with programmable network platform 103. In other words, the orchestration engine 118 offers a "programmable network platform service" having various application engines to handle the API gateway 112 service requests.

As described in further detail below, sub-systems 120 may offer "fiber cross-connect provisioning services" for invocation by orchestration engine 118. Sub-systems 120 and orchestration engine 118 may each be centralized or distributed applications and may execute on a management device such as one or virtual machines and/or real servers of data center(s) 105.

Network infrastructure 122 represents the network and optical switching fabric of data center(s) 105 connected to the provider-side ports of panels 108. A customer may, using an application, request a fiber cross-connect between a customer-side port of a first panel 108 and customer-side port a second panel 108. In response, PNP 103 configures the optical switch fabric of network infrastructure 122 to create a fiber cross-connect 130 so as to interconnect the two tenants.

Figure 5:
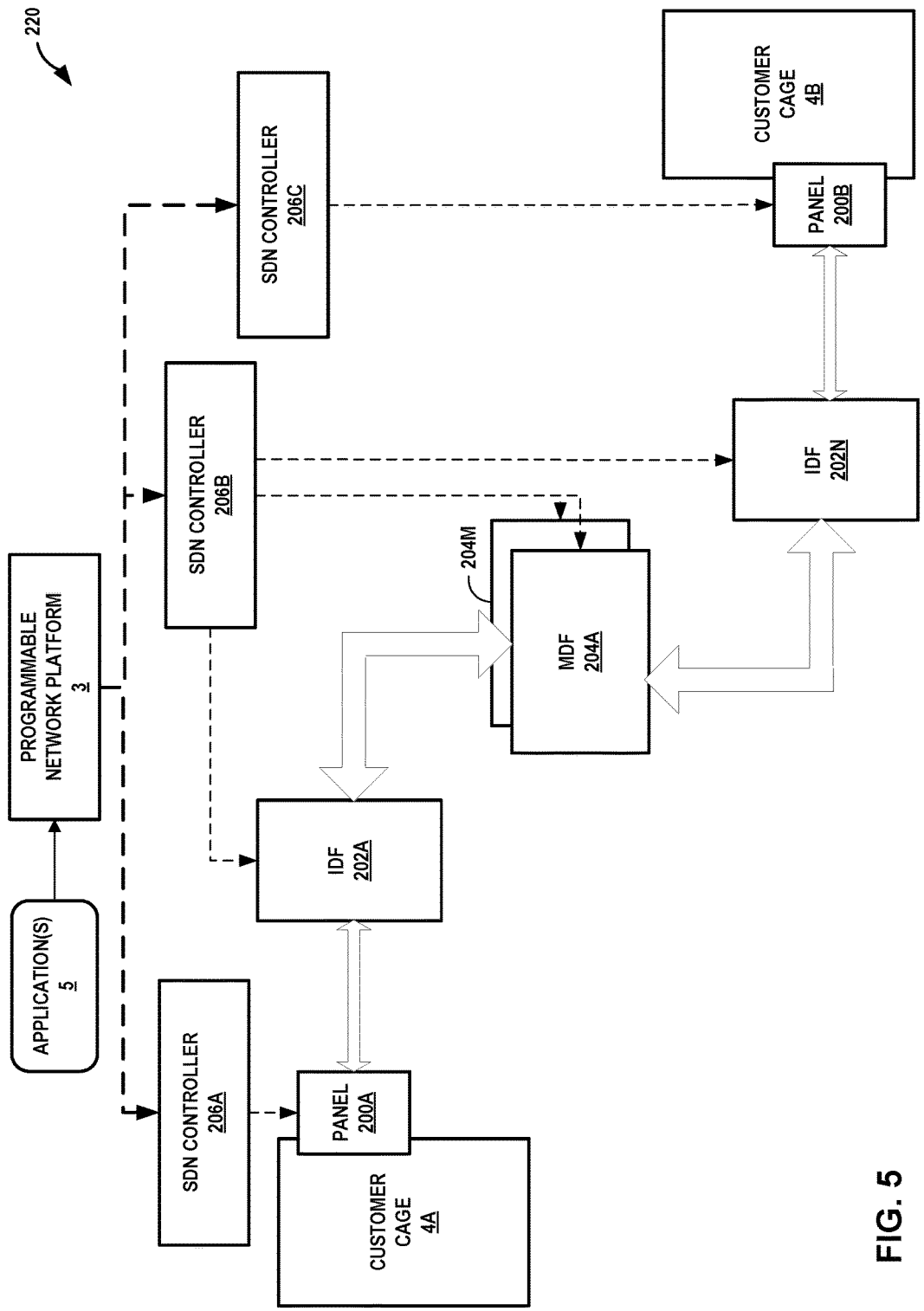
FIG. 5 is a block diagram illustrating a distributed data center with automated fiber infrastructure.

FIG. 5 is a block diagram illustrating a distributed data center with automated fiber infrastructure. Distributed data center 220 includes multiple data centers each having at least one distribution facility and customer cages 4 for tenants of the distributed data center provider. For example, each data center may include one of main distribution facilities (MDFs) 204A-204M and one or more of intermediate distribution facilities (IDFs) 202A-202N. Each of MDFs 204, 202 and each of panels 200A, 200B includes at least one photonic switch as described above. An alternative to mesh topology of a set of MDF and IDFs is meet-me-room (a centralized room) where all interconnections end with hub and spoke topology.

That is, the photonic switches may have different modularity and be located at the customer cage (demarcation area or panels 200A, 200B), IDF 202, and MDF 204 locations. As described herein, PNP 3 automatically provisions, using SDN controllers 206A-206C, fiber cross-connects made up of service and data rate agnostic optical switching technologies controlled by the SDN controller 206. Individual fiber strands routed using the overhead fiber trays (or below the floor) may be reduced by using bulk high capacity fiber cables with 432/864/1728 fibers between the IDF 202 and MDF 204. Individual fiber strands (simplex or duplex) may be limited to and from IDFs 202 to customer cages 4 (alternatively, to clusters or zones) to allow flexibility in resizing spaces/zones.

This infrastructure may be duplicated in multiple data centers across a greater metro or Wide Area Network (WAN) area. Programmable network platform 3 operates as an orchestrator to centrally orchestrate SDN controllers 206 interfacing with the fiber cross-connects located at multiple data centers to create a distributed data center fiber infrastructure fabric across the metro/WAN. MDFs 204 in multiple data centers in the metro are interconnected either by bulk dark fiber (e.g., in the case of campus data centers and multi-story buildings) or via one or more Dense Wavelength Division Multiplexing (DWDM) transport optical networks built using leased or owned dark fibers across the metro/WAN.

The fiber cross-connect service provider representative may interface, via an application or directly, with PNP 3 that provides a central provisioning and monitoring system. The representative may send fiber cross-connect service provisioning instructions to PNP either in batches or one request at a time. Provisioning may also be done automatically at a preprogrammed date and time with detailed specifications, service end points (e.g., customer-side and/or provider-side ports), and performance requirements. PNP 3 checks for the physical fiber and logical network infrastructure resources and creates the requested fiber cross-connects. PNP 3 may further monitor the health of the connections and provide data regarding the fiber cross-connects to one or more central network operations centers (NOC) where the provisioning and monitoring systems are located.

The techniques described herein may provide one or more advantages. For example, an interconnection system provider or fiber cross-connect provider may, from a home office, use the techniques to remotely provision fiber cross-connects in any metro anywhere in the world given a pool of pre-installed/pre-cabled fiber ports for use. Further, the techniques may enable inventory tracking of passive assets such as fiber cables and fiber cross-connect systems, connection tracking for all services including all types of fiber cross-connects, and correlation of physical and logical services to the physical fiber and hardware platforms.

In some examples, the techniques may provide automated connection provisioning and disconnections to increase operations efficiencies (by avoiding mining out fiber for customer disconnects or churn which could be used for new connection services), remotely provisioned network services that make use of fiber infrastructure, remotely monitoring of health or condition of the optical signals in the fiber cables (which may reduce OPEX with fault localization), and protection switching (with automated systems or remote manual intervention) of client services.

In some examples, the techniques may allow for dark fiber monitoring for campus fibers, expanding beyond the boundaries of a single data center to provision services across metro/regional area such that a customer/provider may distribute computing, storage, and network resources to multiple data centers across the metro. The techniques may also overcome services availability constraints in a particular data center. For instance, using a dynamically-provisioned fiber cross-connect, a customer located in one data center can connect to a service platform in a different data center in the same metro.

In some examples, the techniques provide a way to move traffic loads around during demand spikes or when in disasters hit. For instance, an operator can quickly spool up additional fiber cross-connects to handle disaster recovery loads between geographically distributed data centers using the techniques.

The techniques may also be used to interconnect central office locations in telecommunications networks eliminating operations for manual patching of fiber and/or optical connections. As described in FIG. 5, above and elsewhere, a network system orchestrator (e.g., PNP 3) can interface with SDN controllers 206 for types of equipment such as network switches and network routers to create higher layer services that also require physical fiber level or virtual optical connection (sub-wavelength).

Figure 6:
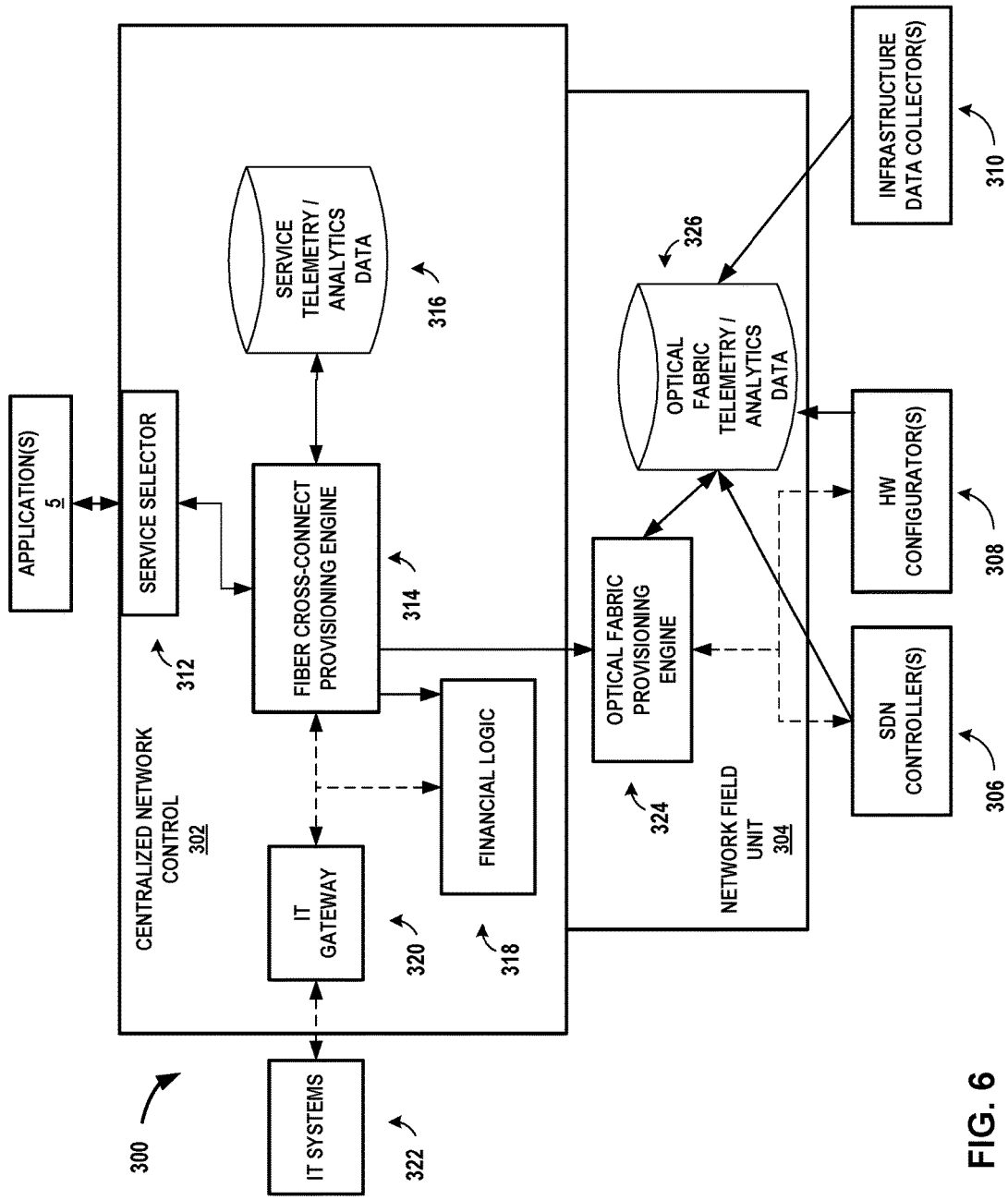
FIG. 6 is a block diagram illustrating an example architecture for a programmable network platform configured to dynamically provision fiber cross-connects within one or more interconnection facilities to interconnect multiple customers of the interconnection system provider.

FIG. 6 is a block diagram illustrating an example architecture for a programmable network platform configured to dynamically provision fiber cross-connects within one or more interconnection facilities to interconnect multiple customers of the interconnection system provider. FIG. 6 illustrates a programmable network platform 300 that includes multiple components, which collectively provide for dynamic configuration and management of metro-based interconnection facilities, in particular for the dynamic provisioning of fiber cross-connects. Programmable network platform 300 includes centralized network control (CNC) system 302 and one or more network field units (NFUs) 304 configured to interface with one or more software-defined networking (SDN) controllers 306, one or more hardware configurator(s) 308, one or more infrastructure data collector(s) 310, and information technology systems 322. Programmable network platform 300 may represent an example instance of programmable network platform 3 or another programmable network platform, controller, or system described herein for automatically provisioning fiber-cross connects.

Programmable network platform 300 may provide for the orchestration of a fiber cross-connect service. In the example of FIG. 6, CNC system 302 enables the automation of aspects of fiber cross-connect provisioning. As such, CNC system 302 may provide one or more software interfaces that allow customers to establish, de-install, and manage interconnections with other customers, such as one or more cloud service providers co-located in an interconnection facility, in an automated and seamless manner. CNC system 302 may include logic to receive a business service request via an API call and convert that into the necessary business instantiation parameters and network provisioning parameters to be delivered and assured as a business service. CNC system 302 may be the central intelligent processing unit of the orchestration system (e.g., programmable network platform 300) and there may be one logical instance of this intelligent logic present per instantiation.

In some examples, NFU 304 is implemented as a self-contained unit that receives requests or instructions from CNC system 302 to configure network infrastructure of a particular interconnection facility for one or more services. For instance, NFU 304 may comprise a combination of hardware and software. In some examples, NFU 304 may be a virtual machine. In any case, NFU 304 receives requests or instructions CNC system 302 based on customer requests submitted to CNC system 302. As further described below, NFU 304 may determine whether sufficient resources exist to provide the services requested by CNC system 302. If sufficient resources exist, NFU 304 may communicate or otherwise interoperate with SDN controllers 306, hardware configurators 308, and infrastructure data collectors 310 to configure the network infrastructure to provide the requested service. NFU 304 may represent a globally distributed intelligent logical unit that receives network instantiation commands from CNC system 302 and instantiates and configures the network resource that is needed to deliver the service. NFU 304 may have the intelligence to deliver and assure network services as per the request of CNC system 302 and also has the capability of communicating with a third party orchestration system if needed by the service request.

In some examples, multiple interconnection facilities may be geographically dispersed. Each geographically positioned interconnection facility may have a corresponding NFU that is geographically positioned at the same location as the respective cloud exchange point. The corresponding NFU may configure and otherwise manage the network infrastructure and optical switch fabric of the particular geographically positioned interconnection facility. In this way, a particular NFU may receive requests or instructions from CNC system 302 and configure the network infrastructure and optical switch fabric of the interconnection facility that is managed by the particular NFU. In some cases, multiple interconnection facilities of a metropolitan area make up a metro-based interconnection facility managed by a single NFU.

NFU 304 may therefore represent the distributed processing unit of programmable network platform 300, which provides programmable network platform 300 with the ability to horizontal scale and deliver and assure services. NFU 304 is the component of programmable network platform 300 that may provide the functionality of delivering the services in a vendor agnostic and form factor agnostic manner. As shown in FIG. 6, NFU 304 has several software components that enable the distributed processing unit to deliver the services.

In order to provision fiber cross-connects to customers and providers co-located in interconnection facilities managed by PNP 300, CNC system 302 includes a service selector 312. In some examples, service selector 312 may operate as an API gateway. For example, service selector 312 may expose software interfaces defined according to one or more APIs. Requests and/or instructions received by service selector 312 may be include the form of create, read, update, and/or delete (CRUD) requests made with respect to fiber cross-connects provided by and/or delivered by the interconnection facilities. Applications may invoke endpoints of the APIs provided by service selector 312, which may in turn invoke fiber cross-connect provisioning engine 314. Service selector 312 may execute on one or virtual machines and/or real servers, for instance. Although shown as a single element in FIG. 6, service selector 312 may comprise a cluster of one or more physical and/or virtual computing machines executing on one or more physical processors. In some aspects, service selector 312 provides a service catalog the describes available services and providers for the available services.

Fiber cross-connect engine 314 may receive requests to provision services from service selector 312. Fiber cross-connect engine 314, in conjunction with network field unit 304, organizes, directs and integrates underlying hardware and software sub-systems for managing various aspects of service provisioning within the network infrastructure as well as cloud services management. For instance, fiber cross-connect provisioning engine 314 may provide a rule-driven workflow engine that operates between service selector 312 and the underlying optical switch fabric for at least one interconnection facility that is configured by network field unit 304. In this way, fiber cross-connect provisioning engine 314 can be invoked via service selector 312 by customer-proprietary applications or an interconnection system provider-based customer portal, for direct participation with the programmable network platform 300 of an automated fiber cross-connect infrastructure that is configured by network field unit 304. As further described below, NFU 304 may receive instructions and/or requests from CNC system 302, which NFU 304 uses to provision segments of an end-to-end fiber-cross-connect at an interconnection facility.

Fiber cross-connect provisioning engine 314 may query and store service telemetry and analytics data (STAD) 316 in one or more data stores. STAD 316 may include metrics about the quantity, type, definition, and consumers of cross-connect services that are configured by fiber cross-connect provisioning engine 314. STAD 316 may include analytics information based on raw metrics data from NFU 304. For instances, analysis information of STAD 316 may include historical statistics and/or real-time statistics, which may be analyzed on various dimensions, such as consumer, service type, service use, to name only a few examples. PNP 3 may be used to configure multiple types of services other than cross-connect, in some examples.

CNC system 302 may also include financial logic 318. Financial logic 318 may store accounting information for customers. For instance, financial logic 318 may store billing information for customers, such as name, address, phone number, email, to name only a few examples. When fiber cross-connect provisioning engine 314 configures a fiber cross-connect service for a customer that includes a service charge, financial logic 318 may store such expense information. In this way, financial logic 318 may provide an accounting of services purchased by a customer and provide billing for such services.

CNC system 302 may include Information Technology (IT) gateway 320 that interfaces with IT systems 322. IT systems 322 may include one or more computing devices, such as desktop computers, tablets, smartphones, and servers, to name only a few examples. IT systems 322 may provide one or more user interfaces to administrators, which may use IT systems 322 to administer CNC system 302. IT systems 322 may, for example, receive user inputs to configure CNC system 302 and/or NFU 304. Based on the user inputs, IT systems 322 may send requests and/or instructions to CNC system 302, which are received by IT gateway 320. In some examples, CNC system 302 may provide or otherwise expose one or more RESTful interfaces that can be called or otherwise invoked by IT systems 322. IT gateway 320 may route such instructions or requests to other components within CNC system 302 for further processing based on the type of requests and/or instructions.

As described above, NFU 304 may receive requests or instructions from CNC system 302 to provision one or more cross-connect services. Optical fabric provisioning engine 324 may receive the requests and/or instructions from fiber cross-connect provisioning engine 314. Optical fabric provisioning engine 324 may determine whether sufficient resources exist to satisfy a request for a fiber cross-connect service to be configured in the requisite interconnection facilities. In some examples, optical fabric provisioning engine 324 may query one or more components such as SDN controllers 306, hardware configurators 308, and/or optical fabric telemetry and analytics data (OFTAD) 326. If sufficient resources exist to provision a requested service, optical fabric provisioning engine 324 may send instructions and/or requests to one or more of SDN controller 306 and/or hardware configurators 308 to cause the requisite components to be configured to provision the requested service. As such, optical fabric provisioning engine 324 provides the functionality of selecting the vendor, and form factor in which the service is delivered. Optical fabric provisioning engine 324 also provides the policy manager functionality to ensure the service is delivered in the correct order of operations.

Optical fabric provisioning engine 324 may query and store optical switch fabric telemetry and analytics data (OFTAD) 326 in one or more data stores. OFTAD 326 may include metrics about the quantity, type, definition, of network, optical switch fabric, and resource configurations that are configured by NFU 304. OFTAD 326 may include analytics information from infrastructure data collectors 310 based on raw metrics data for resources used in a particular service. For instances, analysis information of OFTAD 326 may include historical statistics and/or real-time statistics. OFTAD 326 may further include data describing fiber usage in the optical switch fabric, such as those optical fibers and optical ports of photonic switches currently being used in an optical cross-connect.

As shown in FIG. 6, SDN controllers 306 may configure optical switch fabric resources, such as photonic switches, active panels, and the like, which provider the physical infrastructure for end-to-end fiber cross-connects to carry optical signals through interconnection facilities. In some cases, SDN controllers 306 may configure network resources, such as routers, switches, bridges, and the like, which provide the physical infrastructure to carry network traffic through an interconnection facility. Hardware configurators 308 may configure hardware resources, such as servers or the above-mentioned network and/or optical switch fabric resources; resources within servers and network resources including processor allocation, memory allocation; storage appliances; other hardware resources; and software configurations that may be configured to provision services to a customer. Infrastructure data collectors 310 may collect metrics about the quantity, type, definition, of network and resource configurations that are configured by NFU 304. For instance, infrastructure data collectors 310 may monitor and measure metrics of network and optical switch fabric resources and any other resources configured to provision services to a customer. Infrastructure data collectors 310 may store such metrics in OFTAD 326.

Programmable network platform 300 may in some examples represent an intelligent centralized service delivery and assurance system with the ability to have fault mitigation Monitor/Analyze/Plane/Execute (MAPE) loop, that will ensure the service delivered by the system is assured to adhere the service level agreement for the life cycle of the service. Programmable network platform 300 in some examples not only delivers services that can be offered by its own delivery infrastructure but also has the capability to communicate across other orchestration systems to deliver a combined homogeneous service. Programmable network platform 300, or more specifically CNC system 302, may be the central control center for both operations and business related functions to be performed.

NFU 304 and CNC system 302 may also fulfill the need for having a distributed orchestration system for creating services and distributing the intelligence of delivering and assuring fiber cross-connect services. Programmable network platform 300 provides the advantage of providing a distributed, horizontally scaling architecture. CNC 302 and one or more NFUs 304 may provide the functionality of delivering and assuring a business service into two distinctly separate functions, (1) CNC—may handle the function of converting the business request into service parameters, (2)

NFU—may handle the function of converting the service parameters into optical switch fabric parameters and instantiating the service.

Figure 7:
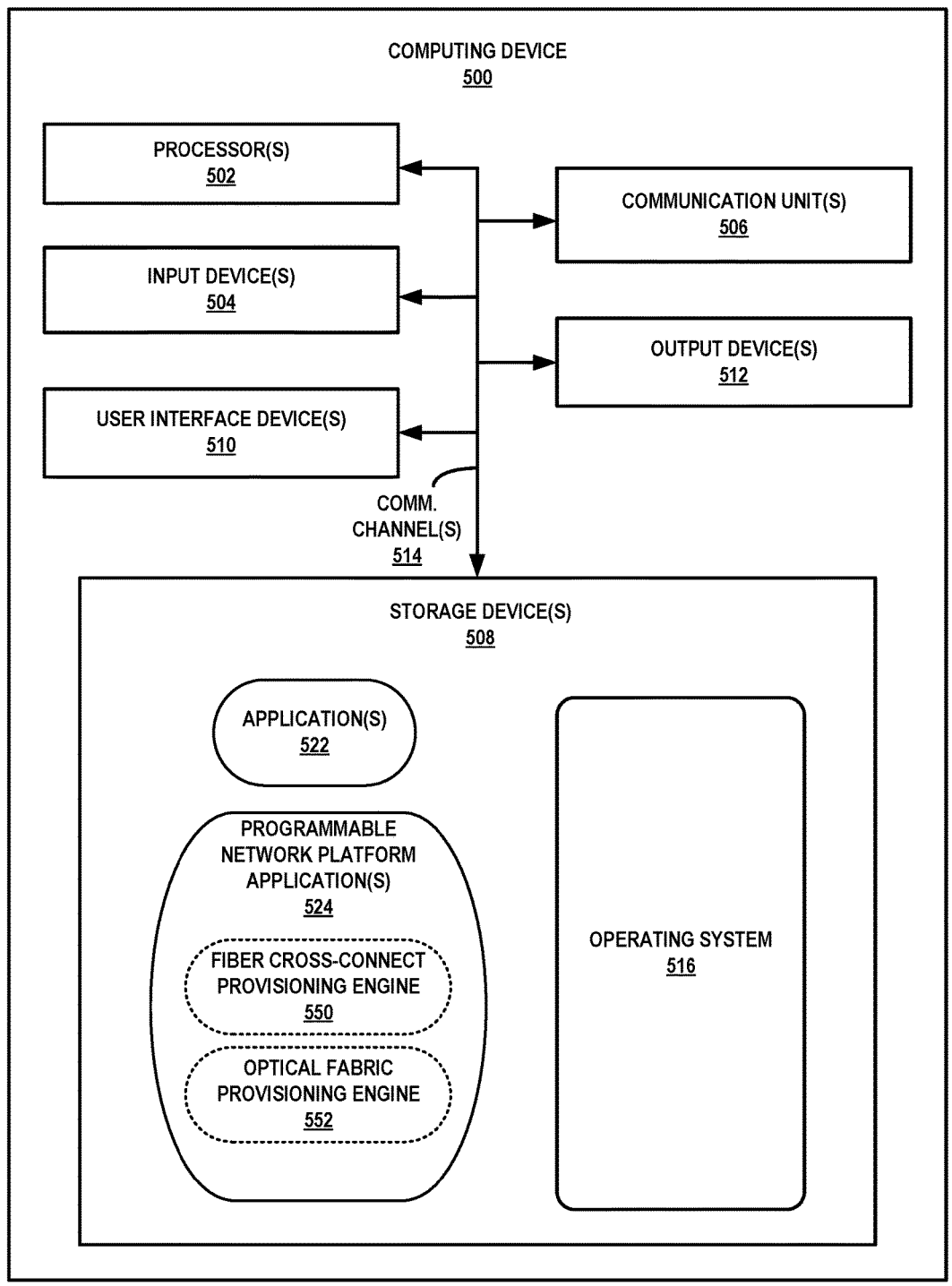
FIG. 7 is a block diagram illustrating further details of one example of a computing device that operates in accordance with one or more techniques of the present disclosure.

FIG. 7 is a block diagram illustrating further details of one example of a computing device that operates in accordance with one or more techniques of the present disclosure. FIG. 7 may illustrate a particular example of a server or other computing device 500 that includes one or more processor(s) 502 for executing any one or more of API gateway 112, orchestration engine 118, sub-systems 120, PNP 3, CNC 302, NFU 304, or any other computing device described herein. Other examples of computing device 500 may be used in other instances. Although shown in FIG. 7 as a stand-alone computing device 500 for purposes of example, a computing device may be any component or system that includes one or more processors or other suitable computing environment for executing software instructions and, for example, need not necessarily include one or more elements shown in FIG. 7 (e.g., communication units 506; and in some examples components such as storage device(s) 508 may not be co-located or in the same chassis as other components).

As shown in the specific example of FIG. 7, computing device 500 includes one or more processors 502, one or more input devices 504, one or more communication units 506, one or more output devices 512, one or more storage devices 508, and user interface (UI) device 510, and communication unit 506. Computing device 500, in one example, further includes one or more applications 522, virtual concept-building application 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and programmable network platform application(s) 524 with processors 502, communication unit 506, storage device 508, input device 504, user interface devices 510, and output device 512.

Application 522 and programmable network platform application(s) 524 may also include program instructions and/or data that are executable by computing device 500. Example programmable network platform application(s) 524 executable by computing device 500 may include any one or more of an orchestration engine module, API gateway module, and sub-systems; or in the illustrated architecture to include fiber cross-connect provisioning engine 550 or optical fabric provisioning engine 552, each illustrated with dashed lines to indicate that these may or may not be executable by any given example of computing device 500.

Fiber cross-connect provisioning engine 550 may include instructions for causing computing device 500 to perform one or more of the operations and actions described in the present disclosure with respect to fiber cross-connect provisioning engine 314. Optical fabric provisioning engine 552 may include instructions for causing computing device 500 to perform one or more of the operations and actions described in the present disclosure with respect to optical fabric provisioning engine 324.

Figure 8:
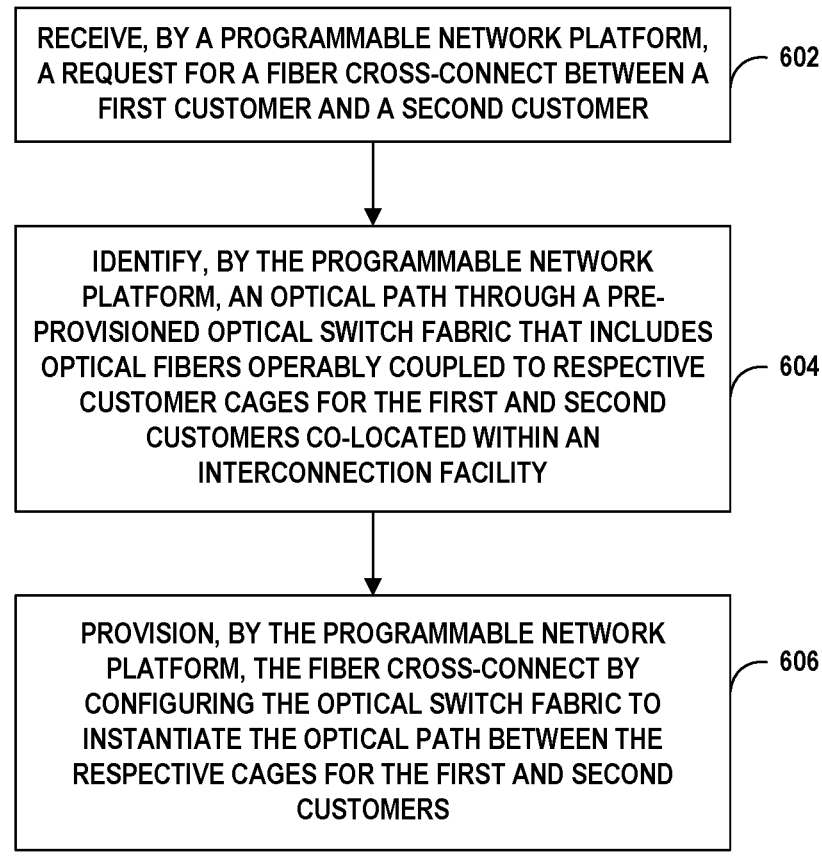
FIG. 8 is a flowchart illustrating example mode of operation for providing on-demand fiber cross-connects with an interconnection system, in accordance with one or more aspects of the present disclosure.

FIG. 8 is a flowchart illustrating example mode of operation for providing on-demand fiber cross-connects with an interconnection system, in accordance with one or more aspects of the present disclosure. FIG. 8 is described with reference to FIG. 1 but is applicable to other examples of interconnection systems described in this disclosure.

An interconnection system provider may deploy a programmable network platform 3 for an interconnection system that includes one or more interconnection facilities having customer cages for co-located customers of the interconnection system provider. The programmable network platform 3 exposes a service interface (e.g., APIs 114 or service selector 312) by which applications may request automated fiber-cross connects.

The programmable network platform 3 receives a request for a fiber cross-connect between a first customer and a second customer of the interconnection system provider (602). In response, the programmable network platform 3 identifies an optical path through an optical switch fabric 10 (604). The optical switch fabric 10 includes pre-installed optical fibers connectivity prior to the PNP 3 receiving the request and may include optical fibers operably coupled to respective customer cages for the first customer and the second customer, as well as configurable photonic switches interconnected by further optical fibers in an optical network topology.

Upon identifying a suitable optical path to cross-connect the respective customer cages for the first customer and the second customer, the programmable network platform 3 provisions the request fiber cross-connect 7 by configuring the optical switch fabric 10 in order to instantiate the optical path such that equipment located within the respective customer cages may exchange optical signals via the fiber cross-connect 7 (606). The programmable network platform 3 may provision the fiber cross-connect without altering the material configuration of optical fibers of optical switch fabric 10. That is, neither the programmable network platform 3 nor the interconnection system provider need make any changes to the topology of the optical switch fabric by, e.g., running additional optical fiber to a customer cage or between photonic switches. Rather, programmable network platform 3 may automatically provision the fiber cross-connect 7 without human intervention.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. An interconnection system comprising:
at least one interconnection facility and a programmable network platform,
the at least one interconnection facility including:
an optical switch fabric having a plurality of optical fibers and a plurality of photonic switches interconnected by the plurality of optical fibers;
a first customer space, for a first customer of an interconnection system provider for the interconnection system, within the at least one interconnection facility, the first customer space associated with a first fiber patch panel comprising a first plurality of provider-side optical ports accessible to the interconnection system provider and a first plurality of customer-side optical ports accessible to the first customer from the first customer space, the first plurality of provider-side optical ports including a first provider-side optical port operably coupled to a first optical fiber from the plurality of optical fibers; and
a second customer space, for a second customer of the interconnection system provider, within the at least one interconnection facility, the second customer space associated with a second fiber patch panel comprising a second plurality of provider-side optical ports accessible to the interconnection system provider and a second plurality of customer-side optical ports accessible to the second customer from the second customer space, the second plurality of provider-side optical ports including a second provider-side optical port operably coupled to a second optical fiber from the plurality of optical fibers, and
the programmable network platform configured to, in response to receiving a fiber cross-connect request that requests an interconnection between the first customer and the second customer and specifies an identifier for the first provider-side optical port and an identifier for the second provider-side optical port for an end-to-end optical fiber cross-connect, configure the plurality of photonic switches to create an optical fiber cross-connect between the first optical fiber and the second optical fiber to provide the end-to-end optical fiber cross-connect that includes the first optical fiber, the second optical fiber, and the optical fiber cross-connect.

2. The interconnection system of claim 1,
wherein the at least one interconnection facility comprises one or more interconnection system provider cages that enclose a provider space within the at least one interconnection facility that is accessible only to the interconnection system provider,
wherein each interconnection system provider cage of the one or more interconnection system provider cages includes at least one photonic switch of the plurality of photonic switches, and
wherein the optical fiber cross-connect comprises respective transmission paths for the plurality of photonic switches.

3. The interconnection system of claim 2, wherein the one or more interconnection system provider cages comprise a main distribution facility and plurality of intermediate distribution facilities, the main distribution facility including at least one photonic switch of the plurality of photonic switches operably coupled, via the plurality of optical fibers, to photonic switches included in the plurality of intermediate distribution facilities.

4. The interconnection system of claim 1, wherein the first fiber patch panel comprises:
a photonic switch configured to, in response to receiving configuration data according to a configuration initiated by the programmable network platform, create an optical transmission path between the first provider-side optical port and a customer-side optical port of the first plurality of customer-side optical ports,
wherein the end-to-end optical fiber cross-connect comprises the optical transmission path between the first provider-side optical port and the first customer-side optical port of the plurality of customer-side optical ports.

5. The interconnection system of claim 1, wherein the end-to-end fiber cross-connect comprises a Layer 0 optical transmission path configured to transport optical signals between the first provider-side optical port and the second provider-side optical port.

6. The interconnection system of claim 1, further comprising a network services exchange, the network services exchange comprising one of an Ethernet exchange, an Internet exchange, and a cloud-based service exchange, and
wherein the programmable network platform configures the network services exchange to exchange Layer 2 or Layer 3 packets over the end-to-end fiber cross-connect between respective customer equipment located at the first customer space and the second customer space.

7. The interconnection system of claim 1, further comprising:
one or more software-defined networking (SDN) controllers each responsible for managing at least one photonic switch of the plurality of photonic switches,
wherein, to configure the plurality of photonic switches, the programmable network platform comprises an orchestration engine configured to direct the one or more SDN controllers to configure the plurality of photonic switches.

8. The interconnection system of claim 1, further comprising:
an application including one of a customer portal application accessible to the first customer and an interconnection system provider application accessible only to the interconnection system provider,
wherein the programmable network platform comprises a service interface configured to receive, from the application, the fiber cross-connect request.

9. The interconnection system of claim 1,
wherein the programmable network platform, in response to the fiber cross-connect request, identifies an optical path through the optical switch fabric configurable for optically coupling the first provider-side port and the second provider-side port, and
wherein the programmable network platform, in response to the identifying, configures the plurality of photonic switches to create the optical fiber cross-connect over the optical path.

10. The interconnection system of claim 1, further comprising:
a cloud-based services exchange,
wherein the first customer is an enterprise and the second customer is a cloud service provider.

11. The interconnection system of claim 1, wherein each of the first customer space and the second customer space comprises at least one of a cage, a cabinet, a rack, and a suite.

12. The interconnection system of claim 1, wherein the fiber cross-connect comprises at least one lambda switched by the plurality of photonic switches to provide an optical path for optical signals exchanged between respective customer equipment located at the first customer space and the second customer space.

13. The interconnection system of claim 1, wherein the programmable network platform comprises:
one or more network field units; and
a centralized network control module including:
a service interface configured to receive the fiber cross-connect request; and
a fiber cross-connect provisioning engine configured to determine, based on the fiber cross-connect request, service parameters that specify one or more requirements to implement the end-to-end fiber cross-connect,
wherein the fiber cross-connect provisioning engine is further configured to determine, based on the service parameters, at least one network field unit of the one or more network field units that are capable of servicing the fiber cross-connect request,
wherein the at least one network field unit controls a portion of the optical switch fabric, wherein the service parameters are usable by the at least one network field unit to configure the portion of optical switch fabric to provide a segment of the end-to-end fiber cross-connect, and
wherein the at least one network field unit is configured to configure the portion of optical switch fabric to provide a segment of the end-to-end fiber cross-connect.

14. A computing device comprising:
at least one programmable processor operably coupled to a memory; and
a programmable network platform configured for execution by the at least one programmable processor to:
receive a fiber cross-connect request that requests an interconnection in at least one interconnection facility between a first customer and a second customer and specifies an identifier for a first provider-side optical port and an identifier for a second provider-side optical port for an end-to-end optical fiber cross-connect; and in response to receiving the fiber cross-connect request, configure a plurality of photonic switches to create an optical fiber cross-connect between a first optical fiber and a second optical fiber to provide an end-to-end optical fiber cross-connect that includes the first optical fiber, the second optical fiber, and the optical fiber cross-connect, wherein the first customer has a first customer space located within the at least one interconnection facility and the second customer has a second customer space located within the at least one interconnection facility, wherein the first customer space is associated with a first fiber patch panel comprising a first plurality of provider-side optical ports accessible to an interconnection system provider for the at least one interconnection facility and a first plurality of customer-side optical ports accessible to the first customer from the first customer space, the first plurality of provider-side optical ports including the first provider-side optical port operably coupled to the first optical fiber from a plurality of optical fibers interconnecting the plurality of photonic switches to form an optical switch fabric, and wherein the second customer space is associated with a second fiber patch panel comprising a second plurality of provider-side optical ports accessible to the interconnection system provider and a second plurality of customer-side optical ports accessible to the second customer from the second customer space, the second plurality of provider-side optical ports including the second provider-side optical port operably coupled to the first optical fiber from the plurality of optical fibers.

15. The computing device of claim 14, wherein the end-to-end fiber cross-connect comprises a Layer 0 optical transmission path configured to transport optical signals between the first provider-side optical port and the second provider-side optical port.

16. The computing device of claim 14, wherein the programmable network platform is further configured to configure a network services exchange to exchange Layer 2 or Layer 3 packets over the end-to-end fiber cross-connect between respective customer equipment located at the first customer space and the second customer space.

17. The computing device of claim 14, wherein the programmable network platform is further configured to direct one or more software-defined networking (SDN) controllers to configure the plurality of photonic switches managed by the SDN controllers.

18. The computing device of claim 14,
wherein the programmable network platform is further configured to, in response to the fiber cross-connect request, identify an optical path through the optical switch fabric configurable for optically coupling the first provider-side port and the second provider-side port, and
wherein the programmable network platform is further configured to, in response to the identifying, configure the plurality of photonic switches to create the optical fiber cross-connect over the optical path.

19. The computing device of claim 14, wherein the programmable network platform comprises:
one or more network field units; and
a centralized network control module including:
a service interface configured to receive the fiber cross-connect request; and
a fiber cross-connect provisioning engine configured to determine, based on the fiber cross-connect request, service parameters that specify one or more requirements to implement the end-to-end fiber cross-connect,
wherein the fiber cross-connect provisioning engine is further configured to determine, based on the service parameters, at least one network field unit of the one or more network field units that are capable of servicing the fiber cross-connect request,
wherein the at least one network field unit controls a portion of the optical switch fabric, wherein the service parameters are usable by the at least one network field unit to configure the portion of optical switch fabric to provide a segment of the end-to-end fiber cross-connect, and
wherein the at least one network field unit is configured to configure the portion of optical switch fabric to provide a segment of the end-to-end fiber cross-connect.

20. A method comprising:
receiving, by a programmable network platform for at least one interconnection facility, a fiber cross-connect request that requests an interconnection in the at least one interconnection facility between a first customer and a second customer and specifies an identifier for the first provider-side optical port and an identifier for the second provider-side optical port for an end-to-end optical fiber cross-connect; and
configuring, by the programmable network platform in response to receiving the fiber cross-connect request, a plurality of photonic switches to create an optical fiber cross-connect between a first optical fiber and a second optical fiber to provide an end-to-end optical fiber cross-connect that includes the first optical fiber, the second optical fiber, and the optical fiber cross-connect,
wherein the first customer has a first customer space located within the at least one interconnection facility and the second customer has a second customer space located within the at least one interconnection facility,
wherein the first customer space is associated with a first fiber patch panel comprising a first plurality of provider-side optical ports accessible to an interconnection system provider for the at least one interconnection facility and a first plurality of customer-side optical ports accessible to the first customer from the first customer space, the first plurality of provider-side optical ports including the first provider-side optical port operably coupled to the first optical fiber from a plurality of optical fibers interconnecting the plurality of photonic switches to form an optical switch fabric, and
wherein the second customer space is associated with a second fiber patch panel comprising a second plurality of provider-side optical ports accessible to the interconnection system provider and a second plurality of customer-side optical ports accessible to the second customer from the second customer space, the second plurality of provider-side optical ports including the second provider-side optical port operably coupled to the first optical fiber from the plurality of optical fibers.

21. The method of claim 20, further comprising:
installing, by an interconnection facility provider for the at least one interconnection facility and prior to the programmable network platform configuring the plurality of photonic switches to create the optical fiber cross-connect, the plurality of optical fibers including the first optical fiber and the second optical fiber.

22. An interconnection system comprising:

at least one interconnection facility and a programmable network platform, the at least one interconnection facility including:

an optical switch fabric having a plurality of optical fibers and a plurality of photonic switches interconnected by the plurality of optical fibers;

a first customer space, for a first customer of an interconnection system provider for the interconnection system, within the at least one interconnection facility, the first customer space associated with a first fiber patch panel comprising a first plurality of provider-side optical ports accessible to the interconnection system provider and a first plurality of customer-side optical ports accessible to the first customer from the first customer space, the first plurality of provider-side optical ports including a first provider-side optical port operably coupled to a first optical fiber from the plurality of optical fibers; and a second customer space, for a second customer of the interconnection system provider, within the at least one interconnection facility, the second customer space associated with a second fiber patch panel comprising a second plurality of provider-side optical ports accessible to the interconnection system provider and a second plurality of customer-side optical ports accessible to the second customer from the second customer space, the second plurality of provider-side optical ports including a second provider-side optical port operably coupled to a second optical fiber from the plurality of optical fibers, and the programmable network platform comprising an application programming interface to receive fiber cross-connect requests from applications, wherein the programmable network platform, in response to receipt by the application programming interface of a fiber cross-connect request that requests an interconnection between the first customer and the second customer and specifies an identifier for the first provider-side optical port and an identifier for the second provider-side optical port for an end-to-end optical fiber cross-connect, is configured to configure the plurality of photonic switches to create an optical fiber cross-connect between the first optical fiber and the second optical fiber to provide the end-to-end optical fiber cross-connect that includes the first optical fiber, the second optical fiber, and the optical fiber cross-connect.

* * * * *